United States Patent
Sangameswaran et al.

(10) Patent No.: US 12,206,742 B1
(45) Date of Patent: Jan. 21, 2025

(54) METHODS AND APPARATUS FOR MANAGING NETWORK FUNCTIONS IN A NETWORK CORE

(71) Applicant: Charter Communications Operating, LLC, St. Louis, MO (US)

(72) Inventors: Sushma Sangameswaran, Aurora, CO (US); Peter Andrew Ericksen, Castle Rock, CO (US); Donald Sherker, Parker, CO (US); Mohamed Abdul Kader, Aurora, CO (US); Roger Vidal Burelo, Castle Rock, CO (US); Sean Dougherty, Castle Rock, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 18/239,015

(22) Filed: Aug. 28, 2023

(51) Int. Cl.
*H04L 67/51* (2022.01)
*G06F 16/25* (2019.01)

(52) U.S. Cl.
CPC ............ *H04L 67/51* (2022.05); *G06F 16/252* (2019.01)

(58) Field of Classification Search
CPC ............................... H04L 67/51; G06F 16/252
See application file for complete search history.

(56) References Cited

U.S. PATENT DOCUMENTS

| | | | |
|---|---|---|---|
| 11,405,263 B2* | 8/2022 | Stenberg | H04L 41/5009 |
| 11,425,636 B1* | 8/2022 | Aggarwal | H04W 12/08 |
| 2019/0230556 A1* | 7/2019 | Lee | H04W 28/16 |

OTHER PUBLICATIONS

ETSI TS 129 510 V15.3.0, 5G; 5G System; Network function repository services; Stage 3, (3GPP TS 29.510 version 15.3.0 Release 15), Apr. 2019, 121 pages.
3rd Generation Partnership Project; Technical Specification Group Services and System Aspects; System architecture for the 5G System (5GS); Stage 2 (Release 18), 3GPP TS 23.501 V18.2.2, Jul. 2023, 694 pages.

* cited by examiner

*Primary Examiner* — Nazia Naoreen
(74) *Attorney, Agent, or Firm* — Straub & Straub; Michael P. Straub; Stephen T. Straub

(57) ABSTRACT

A new type of Network Function (NF), referred to as Network Management Function (NMF), is introduced and included in communications network. The NMF implemented in accordance with some embodiments of the invention includes a Network Management Function database (NMFDB) including maintenance mode (MM) flag(s) and control logic for processing received messages from NFs, said control logic using the maintenance mode flag value information in determining which processing operations to perform. The NMF is placed between NFs, which are to be managed by the NMF, and a Network (function) Repository Function (NRF), which includes a typical NRF database which does not include any MM flags. By using the MM flags at the NMF, it is possible to centrally manage the traffic flow and use of individual instances of NFs in the network allowing instances of NFs to be easily taken in and out of service, e.g., as maintenance is required.

20 Claims, 22 Drawing Sheets

| FIGURE 3A |
|---|
| FIGURE 3B |
| FIGURE 3C |
| FIGURE 3D |
| FIGURE 3E |
| FIGURE 3F |
| FIGURE 3G |
| FIGURE 3H |

FIGURE 3

METHODS AND APPARATUS FOR MANAGING NETWORK FUNCTIONS IN A NETWORK CORE

FIELD

The present application relates to communications methods and apparatus, and more particularly, to methods and apparatus for managing network functions in a network core, e.g., a 5G network core.

BACKGROUND

A core network typically includes redundancy in the form of multiple instances of network functions (NFs) of the same type so that if one instance of the NF fails another instance can be used. Sometimes there are regional groupings of NFs. At times a problem may occur which pertains to one regional grouping of NFs and it is desired direct traffic away from the problem group to another alternative group, e.g., a group being used to support another geographic region. In some cases, an individual instance of a NF may need to undergo maintenance or an update, and traffic needs to be directed away from that NF. Typically, in such situations, the individual NF(s), for which traffic needs to be directed away from, are each manually turned off, e.g., re-configured at the site(s) where the NF(s) are located, or manually de-registered from a Network Register Function (NRF). This current approach can be inefficient, labor intensive, time consuming, and/or result in rough or gradual transitions, e.g., due to the decentralized nature and/or poorly coordinated operations at different NF node sites, resulting in throughput loss and/or disruptions to the traffic flows.

Based on the above, there is a need for new methods and apparatus for controlling network functions. It would be advantageous if at least some of these new methods and apparatus facilitated automated centralized control, e.g., allowing one or more network functions to be disabled or taken out of service from a central control system, without requiring manual operations to remove one or more network functions from service.

SUMMARY

Various embodiments of the present invention are directed to methods and apparatus for providing management of Network Functions (NFs) in a network, e.g., from a centralized location, node or system in some but not necessarily all embodiments. A new type of NF, referred to as Network Management Function (NMF), is introduced and included in communications network, e.g., in a core network such as, for example, a 5G core network. In various embodiments the network functions, including, the NMF of the invention, are implemented in hardware with the network function being implemented at one or multiple nodes with some NFs being implemented in a distributed manner using what is sometimes referred to as network or cloud based hardware to implement the network function.

The NMF implemented in accordance with some embodiments of the invention includes a Network Management Function database (NMFDB) that includes maintenance mode (MM) flag(s) and/or control logic for processing received messages from NFs, said control logic using the maintenance mode flag value information in determining which processing operations to perform. In various embodiments an individual NF having an entry in the NMFDB has a corresponding maintenance MM flag which can be set to indicate that the NF to which the individual flag corresponds is or is not in maintenance mode. The NMF is placed between NFs, which are to be managed by the NMF, and a Network (function) Repository Function (NRF), which includes a typical NRF database. The typical NRF database does not include any MM flags but could be enhanced to include MM flags of the type used in the invention.

By using the MM flags along with the control logic included in the NMF and the functionality provided by the NMF, it is possible to centrally manage the traffic flow and use of individual instances of NFs in the network. The NFM of the invention can be used with typical NRFs and allows traffic to be directed away from a particular identified NF by setting the MM flag in the NMFDB to MM enabled (indicating the corresponding NF is in maintenance mode) for that particular NF, which triggers the NMF to send a request to the NRF to change NF status in the NRF database to "SUSPENDED". The NRF notifies subscribed NFs of the NF status change. In addition, the NRF does not direct any new traffic toward the NF, which is now listed as suspended, because the NF listed as suspended is not considered or included in discovery responses. Similarly, traffic can be directed away from a particular grouping of NFs (e.g., a geographic region of NFs) by setting the MM flags in the NMFDB to MM enabled for NFs in the grouping.

The methods and apparatus, in accordance with the present invention can be, and sometimes are, used to centrally manage one or a few NFs during an upgrade and/or during maintenance activity. In addition, when there is a detected or anticipated network issue, e.g., problem, with a particular region or groupings of NFs, and the traffic needs to be directed to a different site, the methods and apparatus, in accordance with the present invention can be, and sometimes are, used to centrally manage the transition from one group of core network NFs (e.g., a west region) to another group of core network function (e.g., an east region). The methods and apparatus, in accordance with the present invention facilitate centralized management of NFs, allowing traffic to rapidly redirected in the network in an efficient and smooth manner with minimal disruption.

An exemplary method of supporting network functions, in accordance with various embodiments, comprises: operating a network management function (NMF) to receive a first network function register request message from a first network function (NF); checking a network management function database (NMFDB), to determine if the first NF is listed in the NMFDB, said NMFDB including maintenance mode flags for individual network functions listed in the NMFDB; and creating, when said check determines that said NMFDB does not include an entry for the first NF an entry in said NMDB for the first NF in said NFNDB; and checking, when said check determines that said NMFDB does include an entry for the first NF, the maintenance mode indicator for the first NF in the NMFDB to determine if maintenance mode is enabled for the first NF or disabled for the first NF.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 3 comprises the combination of FIG. 3A, FIG. 3B, FIG. 3C, FIG. 3D, FIG. 3E, FIG. 3F, FIG. 3G and FIG. 3H.

DETAILED DESCRIPTION

Figure 1:
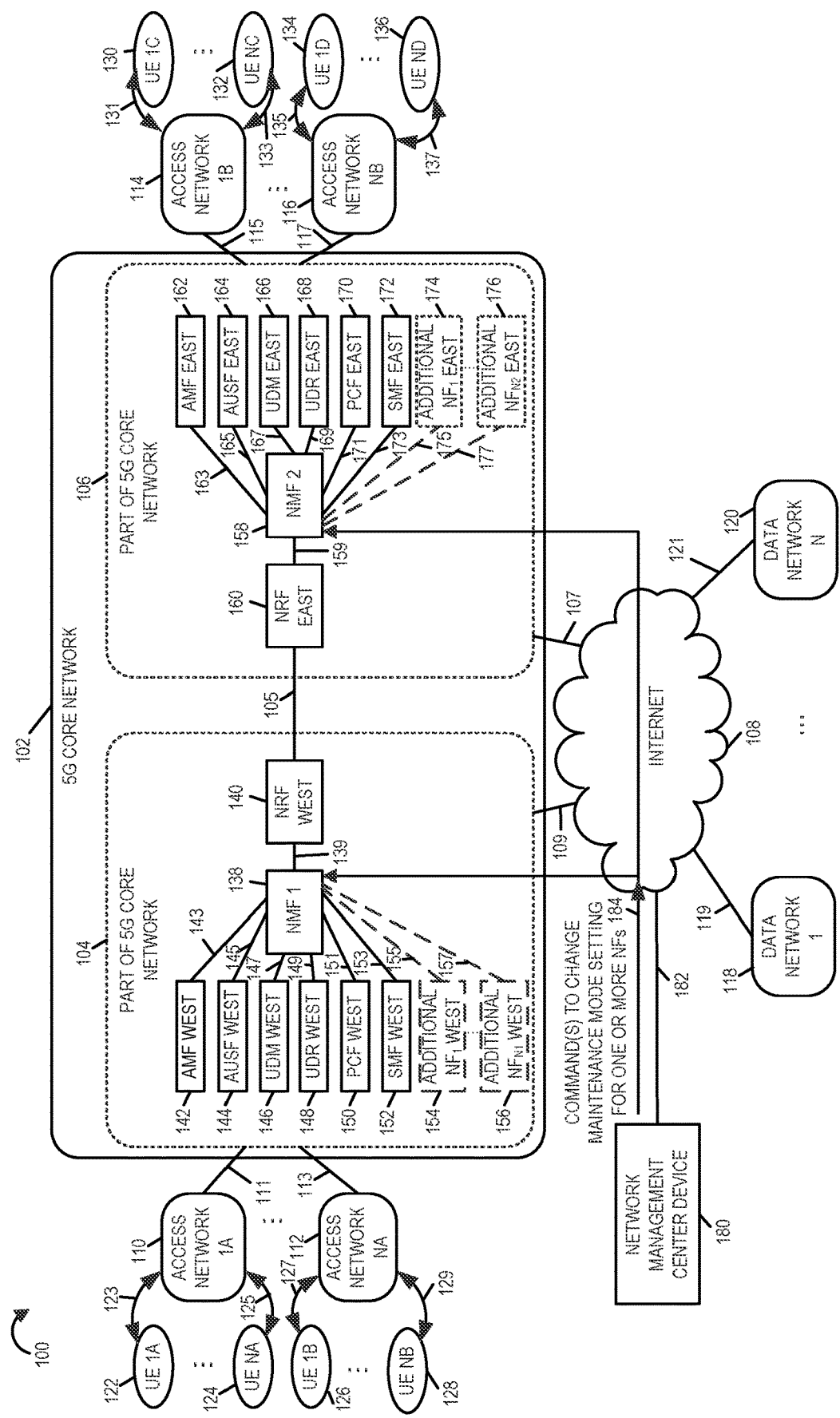
FIG. 1 is a drawing of an exemplary communications system in accordance with an exemplary embodiment.

FIG. 1 is a drawing of an exemplary communications system 100 in accordance with an exemplary embodiment. Exemplary communications system 100 includes a 5G core network 102, e.g., a NR 5G core network, a plurality of access networks (access network 1A 110, . . . , access network NA 112, access network 1B 114, . . . , access network NB 116), Internet 108, a plurality of data networks (data network 1 118, . . . , data network N 120) a plurality of user equipments (UE 1A 122, . . . , UE NA 124, UE 1B 126, . . . , UE NB 128, UE 1C 130, . . . , UE NC 132, UE 1D 134, . . . , UE ND 136), and a network management center device 180 coupled together as shown.

5G core network 102 includes a first part 104, e.g., a western region part, and second part 106, e.g., an eastern region part. First part 104 of 5G core network 102 includes a plurality of network functions including access and mobility management function (AMF) west 142, authentication server function (AUSF) west 144, unified data management (UDM) west 146, unified data repository (UDR) west 148, policy control function (PCF) west 150, and session management function (SMF) west 152, and in some embodiments, one or more additional network functions (additional Network function 1 west 154, . . . , additional network function N1 west 156). In various embodiments, there may be, and sometimes are, multiple instances of the same type of NF included in first part 104 of core network 102, e.g., multiple instances of AMF, multiple instances of AUSF, multiple instances of UDM, multiple instances of UDR, multiple instances of PCF, multiple instances of SMR, etc. First part 104 of 5G core network 102 further includes network management function 1 (NMF 1) 138 and network repository function (NRF) west 140. Network repository function (NRF) is sometimes referred to as a Network function Repository Function or a NF Repository Function (NRF).

Second part 106 of 5G core network 102 includes a plurality of network functions including AMF east 162, AUSF east 164, UDM east 166, UDR east 168, PCF east 170, SMF east 172, NMF 2 158 and NRF west 160, and in some embodiments, one or more additional network functions (additional Network function 1 east 174, . . . . . , additional network function N2 east 176). In various embodiments, there may be, and sometimes are, multiple instances of the same type of NF included in second part 106 of core network 102, e.g., multiple instances of AMF, multiple instances of AUSF, multiple instances of UDM, multiple instances of UDR, multiple instances of PCF, multiple instances of SMR, etc. Second part 106 of 5G core network 102 further includes network management function 1 (NMF 2) 158 and network repository function (NRF) east 160.

The access networks (access network 1A 110, . . . , access network NA 112) are coupled to first part 104 of 5G core network 102 via communications links (111, . . . , 113), respectively. The access networks (access network 1B 114, . . . , access network NB 116) are coupled to second part 106 of 5G core network 102 via communications links (115, . . . , 117), respectively. NRF east 140 is coupled to NRF west 160 via connection 105. First part 104 of 5G core network 102 is coupled to the Internet 108 via communications link 109. Second part 106 of 5G core network 102 is coupled to the Internet 108 via communications link 107. Each of the data networks (data network 1 118, . . . , data network N 120) is coupled to the Internet 108 via communications links (119, . . . , 121), respectively.

The UEs (UE 1A 122, . . . , UE NA 124) are coupled to access network 1A 110, e.g., a radio access network (RAN) such as gNB base station, via communications links (123, . . . , 125), respectively. The UEs (UE 1B 126, . . . , UE NB 128) are coupled to access network NA 112, e.g., a RAN such as a gNB base station, via communications links (127, . . . , 129), respectively. The UEs (UE 1C 130, . . . , UE NC 132) are coupled to access network 1B 114, e.g., a RAN such as gNB base station, via communications links (131, . . . , 133), respectively. The UEs (UE 1D 134, . . . , UE ND 136) are coupled to access network NB 116, e.g., a RAN such as a gNB base station, via communications links (135, . . . , 137), respectively.

Network Functions (NFs) (AMF west 142, AUSF west 144, UDM west 146, UDR west 148, PCF west 150, SMF west 152, additional NF1 west 154, . . . , additional NFN1 west 156) are coupled to NMF1 138 via connections (143, 145, 147, 149, 151, 153, 155, . . . , 157)) respectively. NMF 1 138 is coupled to NRF west 140 via connection 139. Network Functions (NFs) (AMF east 162, AUSF east 164, UDM east 166, UDR east 168, PCF east 170, SMF east 172, additional NF1 east 174, . . . , additional NFN2 east 176) are coupled to NMF2 158 via connections (163, 165, 167, 169, 171, 173, 175, . . . , 177) respectively. NMF 2 158 is coupled to NRF east 160 via connection 159.

Network management center device 180 is coupled to Internet 108 via communications link 182. In the communications system 100 of FIG. 1, the NMFs (NMF 1 138, NMF 2 158) each include a NMF database including maintenance mode flags corresponding to each NF included in the NMF database. The network management center device 180 generates and sends command(s) 184 to NMF 1 138 and/or NMF 2 158 to change the maintenance mode setting for one or more NFs. One exemplary command includes information identifying one or more individual network functions instances for which the maintenance mode setting stored in the NMF is to be changed and information indicating the state to which the maintenance mode setting for the NF is to be set, e.g., information identifying UDR west 148, and information identifying the maintenance mode setting to which UDR west 148 is to be set in NMF 1 138 (e.g., where value 1=indicates maintenance mode is to be enabled, value=0 indicates maintenance mode is to be disabled). Another exemplary command includes information indicating a maintenance mode setting to be implemented in an NMF for a particular identified group of NFs (e.g., NFs corresponding to a geographic region). For example, the command indicates the maintenance mode setting is to be set to one of enabled or disabled for each member of the identified group (e.g., a western group of NFs (142, 144, 146, 148, 150, 152, 154, . . . , 156) or an eastern group of NFs (162, 164, 166, 168, 170, 172, 174, 176).

The NMF takes actions in response to received commands from the network management center device, e.g., updating its internal NFM database including changing a maintenance mode flag setting for one or more NFs and sending a message to the NRF to update state in the NRF. The state maintained in the NMF's database for a particular NF and the state maintained in the NRF database for the same particular NF may be, and sometimes are, different. In various embodiments, a NMF, located between a set of NFs and a NRF, processes received messages from NFs, said processing including taking into consideration a maintenance mode flag setting value. Sometimes, depending on the type of message received and/or the current maintenance mode setting for the NF in the NMFs database, the NMF acts as a proxy for the NRF and forwards a received message to the NRF. Sometimes, depending on the type of message received and/or the current maintenance mode setting for the NF in the NMFs database, the NMF does not forward a received message to the NRF, but does respond to the NF as if the NMF was the NRF. This approach allows a network function (placed in maintenance mode in the NFM database) to remain in a registered state with regard to its local database and the database of the NMF, while the NRF database lists the NF as being in a suspended state, and thus the NRF does not allow the NF to be considered for or included in responses to received discovery requests. Subsequently, when the NMF receives a command to disable maintenance mode with regard to the NF, the NMF pushes state for the NF, which is stored in its NMF database to the NRF which updates its database, and the NRF can again start considering and including, where applicable, the NF (which is now in registered state) in responses to received discovery requests.

Figure 2:
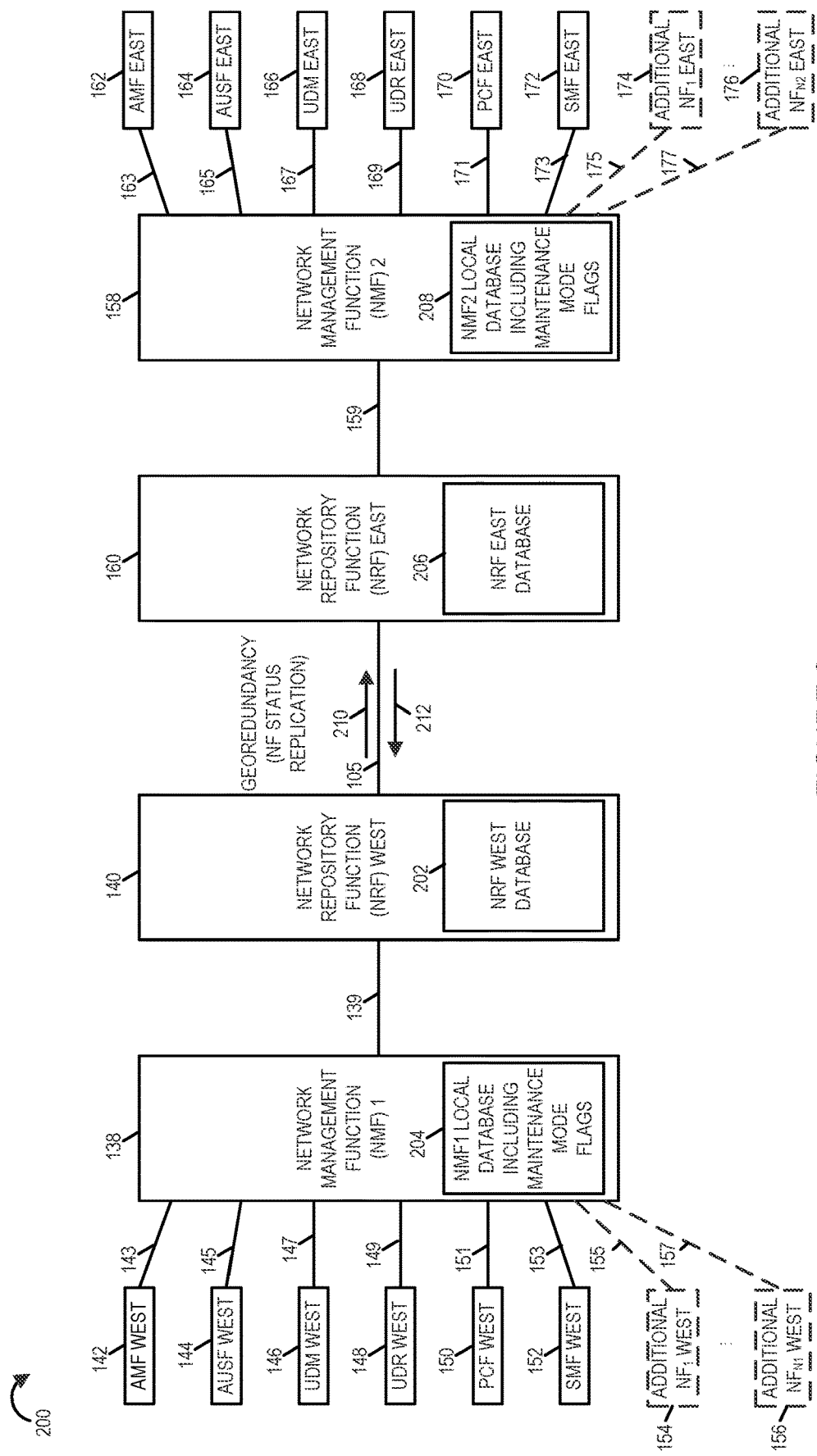
FIG. 2 is a drawing illustrating the exemplary 5G core network of the system of FIG. 1 and further illustrating exemplary databases and exemplary signaling between the NRFs, in accordance with an exemplary embodiment.

FIG. 2 is a drawing 200 illustrating the exemplary 5G core network 102 of system 100 of FIG. 1 and further illustrating exemplary databases and exemplary signaling between the NRFs, in accordance with an exemplary embodiment.

NRF west 140 includes a NRF west database 202. NRF east 160 includes a NRF east database 206. NMF 1 138 (NMF west) includes a NMF1 local database 204 including maintenance mode flags. NMF 2 158 (NMF east) includes a NMF 2 local database 208 including maintenance mode flags. The 5GC of FIG. 2 supports georedundancy with regard to NRF databases (202, 206). Via signaling 210, 212 over connection 105 between NRF west 140 and NRF east 160, NF status replication is performed and maintained, e.g., NFR west database 202 and NRF east database 206 are maintained as mirror copies of one another, and each database (202, 206) includes information regarding status for both west NFs (AMF west 142, AUSF west 144, UDM west 146, UDR west 148, PCF west 150, SMF west 152, additional NF1 west 154, . . . , additional NFN1 west 156) and east NFs (AMF east 162, AUSF east 164, UDM east 166, UDR east 168, PCF east 170, SMF east 172, additional NF1 east 174, . . . , additional NFN2 east 176).

FIG. 3, comprising the combination of FIG. 3A, FIG. 3B, FIG. 3C, FIG. 3D, FIG. 3E, FIG. 3F, FIG. 3G and FIG. 3H, is a flowchart 300 of an exemplary method of operating a communications system, e.g., communications system 100 of FIG. 1, in accordance with an exemplary embodiment. Operation of the exemplary method starts in step 302 in which the communications system is powered on and initialized. Operation proceeds from start step 302 to step 304, 306 and 308. In step 304, a network management function (NMF), e.g., NMF 1 138 (NMF west), monitors to receive a message from a network function (NF). Step 304 is performed repetitively, e.g., on an ongoing basis. In step 306 the NMF monitors to receive a message from a NRF, e.g. NRF west 140. Step 306 is performed repetitively, e.g., on an ongoing basis. In step 308 the NMF monitors to receive a command to modify maintenance mode for one or more NFs on the NMF database. Step 308 is performed repetitively, e.g., on an ongoing basis.

Step 304 includes alternative steps 310, 312, 314, 316 and 318, corresponding to different type of messages which may be, and sometimes are, received by the NMF, e.g., NMF 1 138, from an NF, e.g., one of: AMF west 142, AUSF west 144, UDM west 146, UDR west 148, PCF west 150, SMF west 152, additional NF1 west 154, additional NFN1 west 156.

In step 310 the NMF receives a NF register (put) request from a network function.

In step 312, the NMF receives a NF update (patch) request from a NF.

In step 314, the NMF receives a NF subscribe request from a NF. In step 316 the NMF receives a NF discovery request, e.g., a Nnrf_NF Discovery Service Request from a NF. In step 318 the NMF receives a deregister/delete request from a NF.

Figure 3A:
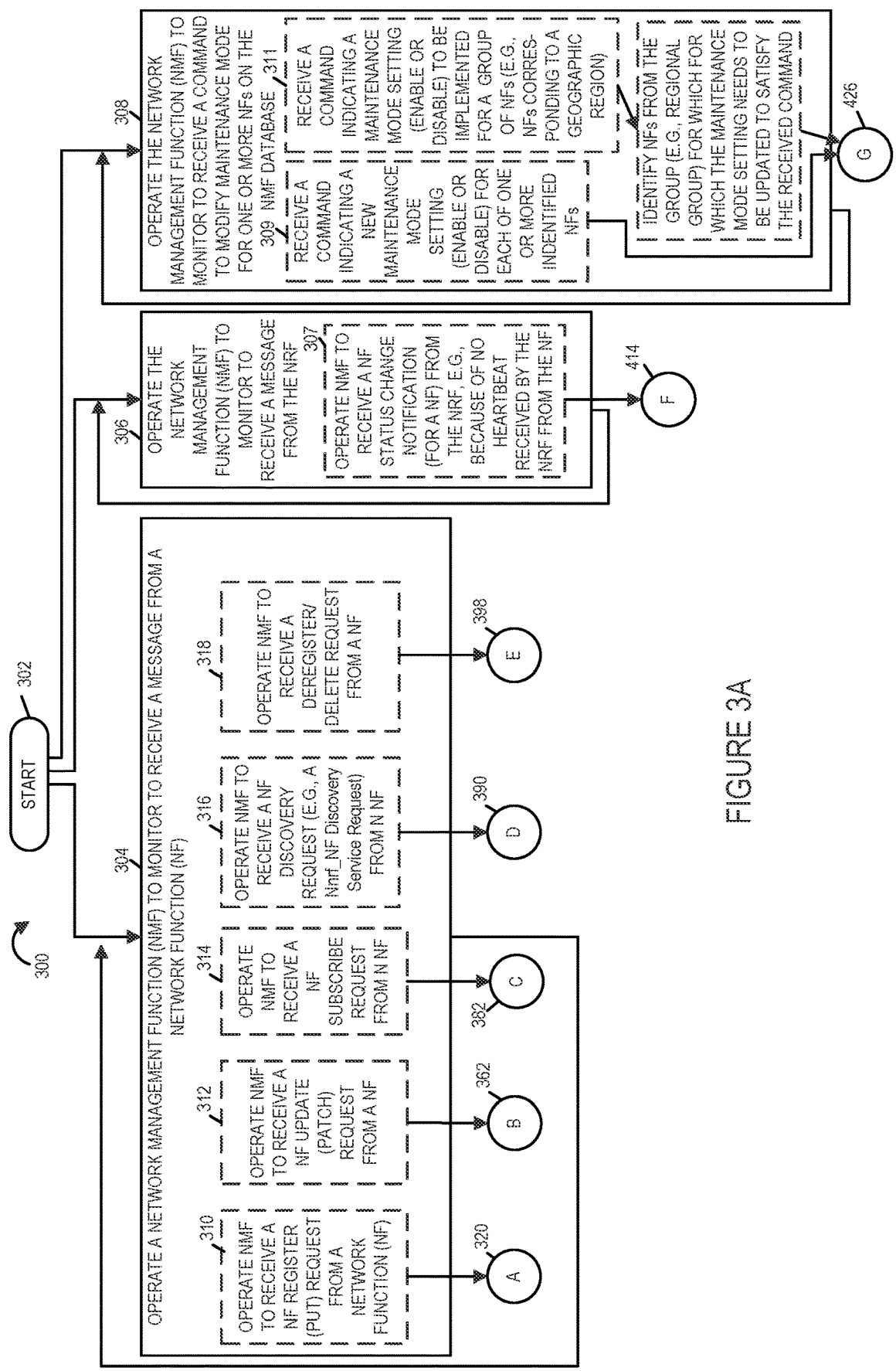
FIG. 3A is a first part of a flowchart of an exemplary method of operating a communications system in accordance with an exemplary embodiment, said first part of the flowchart including steps for operating a network management function (NMF) to monitor for and receive different type of messages.
Figure 3B:
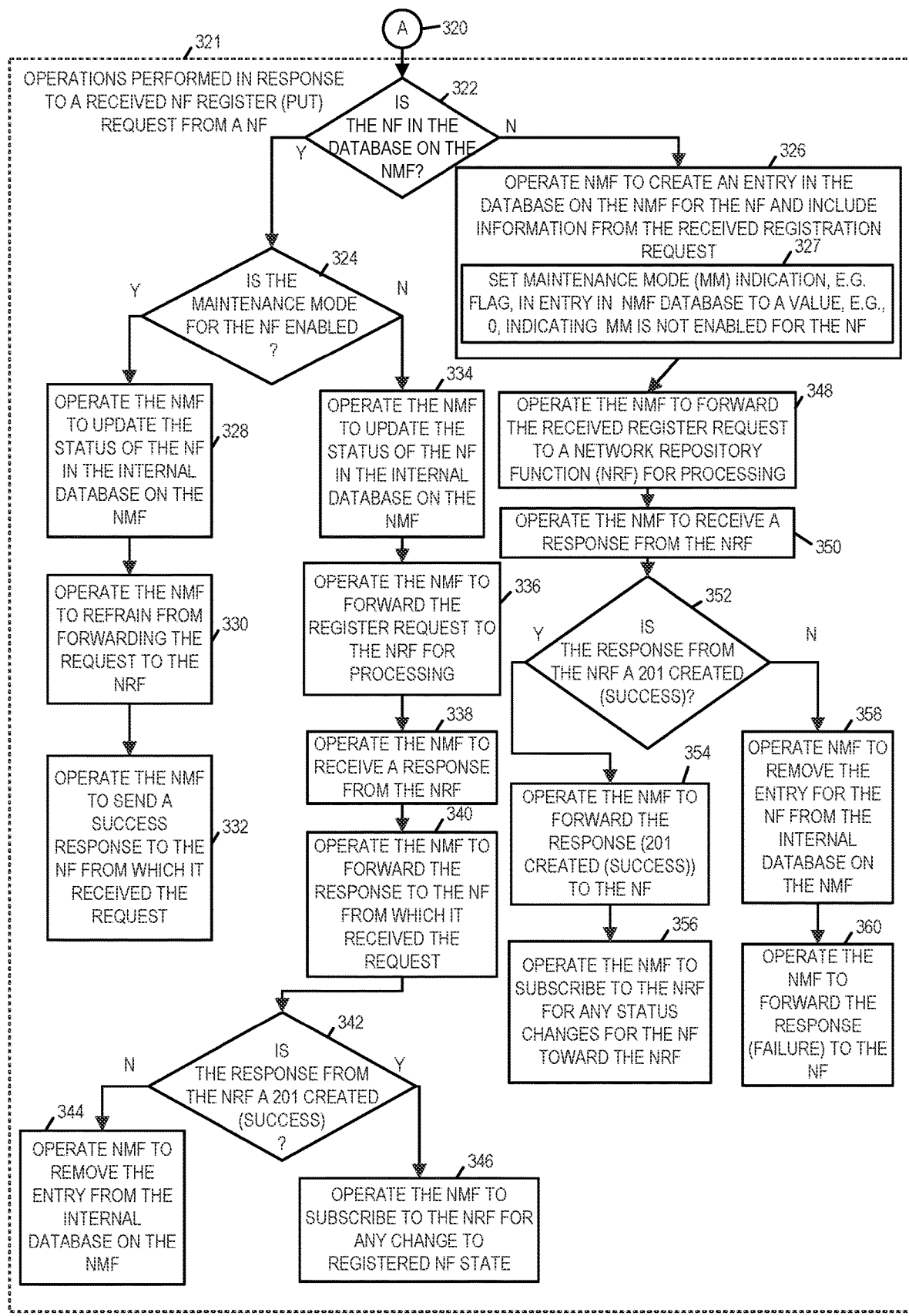
FIG. 3B is a second part of a flowchart of an exemplary method of operating a communications system in accordance with an exemplary embodiment, said second part of the flowchart including steps for operations performed by a NMF in response to a received NF Register (PUT) request from a NF.

Operation proceeds from step 310 (see FIG. 3A), via connecting node A 320 to step 322 (see FIG. 3B). In step 322 the NMF determines whether or not the NF (which sent the NF register (put) request), is in the database on the NMF. If the determination of step 322 is that the NF is not in the database on the NMF, then operation proceeds from step 322 to step 326. Alternatively, if the determination of step 322 is that the NF is already in the database on the NMF, then operation proceeds from step 322 to step 324.

Returning to step 326, in step 326, the NMF creates an entry in its database on the NMF for the NF, and store information from the received registration request in its NMF database. Step 326 includes step 327 in which the NMF sets the maintenance mode indicator, e.g., a maintenance mode flag, in the entry for the NF in the NMF database, to a value (e.g., value of 0), indicating maintenance mode is not enabled for the NF.

Operation proceeds from step 326 to step 348. In step 348 the NMF forwards the received register request to a network repository function (NRF), e.g., NRF west 140, for processing. Operation proceeds from step 348 to step 350. In step 350 the NMF receives a response from the NRF, which is a response to the forwarded registration request. In step 352 the NMF determines whether or not the received response from the NRF is a response indicating success, e.g., a 201 created (success) response. If the determination is that the response is a response indicating success (e.g., a 201 created (success) response), then operation proceeds from step 352 to step 354; otherwise, operation proceeds from step 352 to step 358. Returning to step 354, in step 354 the NMF forwards the success response, e.g., 201 created (success) message, to the NF. Operation proceeds from step 354 to step 356. In step 356, the NMF subscribes to the NRF for any status changed for the NF toward the NRF.

Returning to step 358, in step 358 the NMF removes the entry for the NF from its internal database on the NMF. Operation proceeds from step 358 to step 360, in which the NMF forwards the response (failure) to the NF.

Returning to step 324, in step 324 the NMF determines if the maintenance mode (MM) for the NF is enabled in the NMF database (e.g., MM flag for NF set to a value of 1 indicating MM is enabled for the NF). If the determination of step 324 is that MM for the NF is enabled, then operation proceeds from step 324 to step 328. Alternatively, if the determination of step 324 is that MM for the NF is not enabled in the database (e.g., MM flag for NF set to a value of 0 indicating MM is not enabled for the NF), then operation proceeds from step 324 to step 334.

Returning to step 328, in step 328 the NMF updates the status of the NF in the internal database on the NMF. Operation proceeds from step 328 to step 330. In step 330, the NMF is operated to refrain from forwarding the received NF registration request message to the NRF. Operation proceeds from step 330 to step 332. In step 332 the NMF sends a success response to the NF from which it received the NF registration request.

Returning to step 334, in step 334 the NMF updates the status of the NF in the internal database on the NMF. Operation proceeds from step 334 to step 336. In step 336 the NMF forwards the received registration request to the NRF for processing. Operation proceeds from step 336 to step 338. In step 338 the NMF receives a response from the NRF. Operation proceeds from step 338 to step 340, in which the NMF forwards the received response to the NF from which it received the registration request message. Operation proceeds from step 340 to step 342. In step 342 the NMF determines whether or not the received response from the NRF is a response indicating success, e.g., a 201 created (success) response. If the determination is that the response is a response indicating success (e.g., a 201 created (success) response), then operation proceeds from step 342 to step 346, in which the NMB subscribes to the NRF for any change to registered NF state; otherwise, operation proceeds from step 342 to step 344. In step 344, the NMF removes (e.g., reverses) the entry (update of step 334) from the internal database on the NMF.

Step 322, 324, 326, 327, 328, 330, 332, 334, 336, 338, 340, 342, 344, 346, 348, 350, 352, 350, 352, 354, 356, 358 and 360 may be considered a set of operations 321, performed, e.g., by the NMF, in response to a received NF register (put) request from an NF.

Figure 3C:
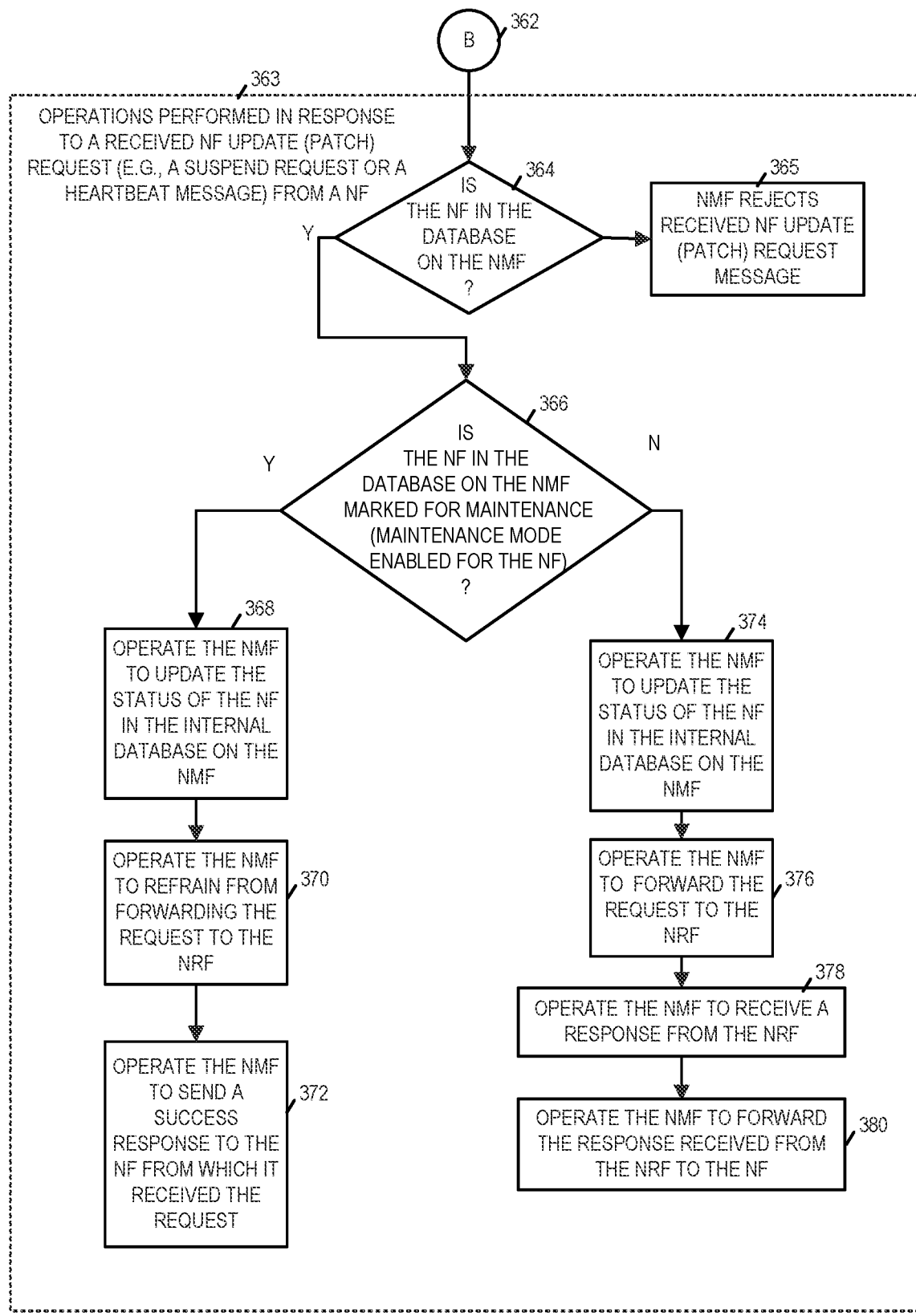
FIG. 3C is a third part of a flowchart of an exemplary method of operating a communications system in accordance with an exemplary embodiment, said third part of the flowchart including steps for operations performed by a NMF in response to a received NF Update (PATCH) request from a NF.

Returning to step 312 (See FIG. 3A), operation proceeds from step 312 (see FIG. 3A), via connecting node B 362 to step 364 (see FIG. 3C). In step 364 the NMF determines whether or not the NF, which sent the received NF update (patch) request, e.g., a state update request such as suspend request, or a heartbeat message, is in the database on the NMF. If the determination of step 364 is that the NF is not in the database on the NMF, then operation proceeds from step 364 to step 365, in which the NMF rejects the received NF update (patch) request. Alternatively, if the determination of step 364 is that the NF, which sent the received NF update (patch) request message, is already in the database on the NMF, then operation proceeds from step 364 to step 366. In step 366 the NMF determines if the NF, which sent the received NF update (patch) request and which is listed in the NMF database, is marked for maintenance, e.g., does the maintenance mode indicator flag for the NF in the NMF database indicate that MM is enabled for the MM, e.g., is the MM indicator flag set to 1 indicating maintenance mode. If the determination of step 366 is that MM is enabled for the NF in the NMF database, then operation proceeds from step 366 to step 368; otherwise, operation proceeds from step 366 to step 374.

In step 368 the NMF updates the status of the NF in the internal database on the NMF.

Operation proceeds from step 368 to step 370. In step 370 the NMF is operated to refrain from forwarding the received NF update (patch) request to the NRF. Operation proceeds from step 370 to step 372. In step 372 the NMF sends a success response to the NF from which it received the NF update (patch) request. Returning to step 374, in step 374 the NMF updates the status of the NF in the internal database on the NMF. Operation proceeds from step 374 to step 376. In step 376 the NMF forwards the received NF update (patch) request to the NRF. Operation proceeds from step 376 to step 378. In step 378 the NMF receives a response from the NRF. Operation proceeds from step 378 to step 380. In step 380 the NMF forwards the response received from the NRF to the NF.

Step 364, 365, 366, 368, 370, 372, 374, 376, 378 and 380 may be considered a set of operations 363, performed, e.g., by the NMF, in response to a received NF update (patch) request, e.g., a NF state update request message such as a suspend request message, or a heartbeat message, from an NF.

Figure 3D:
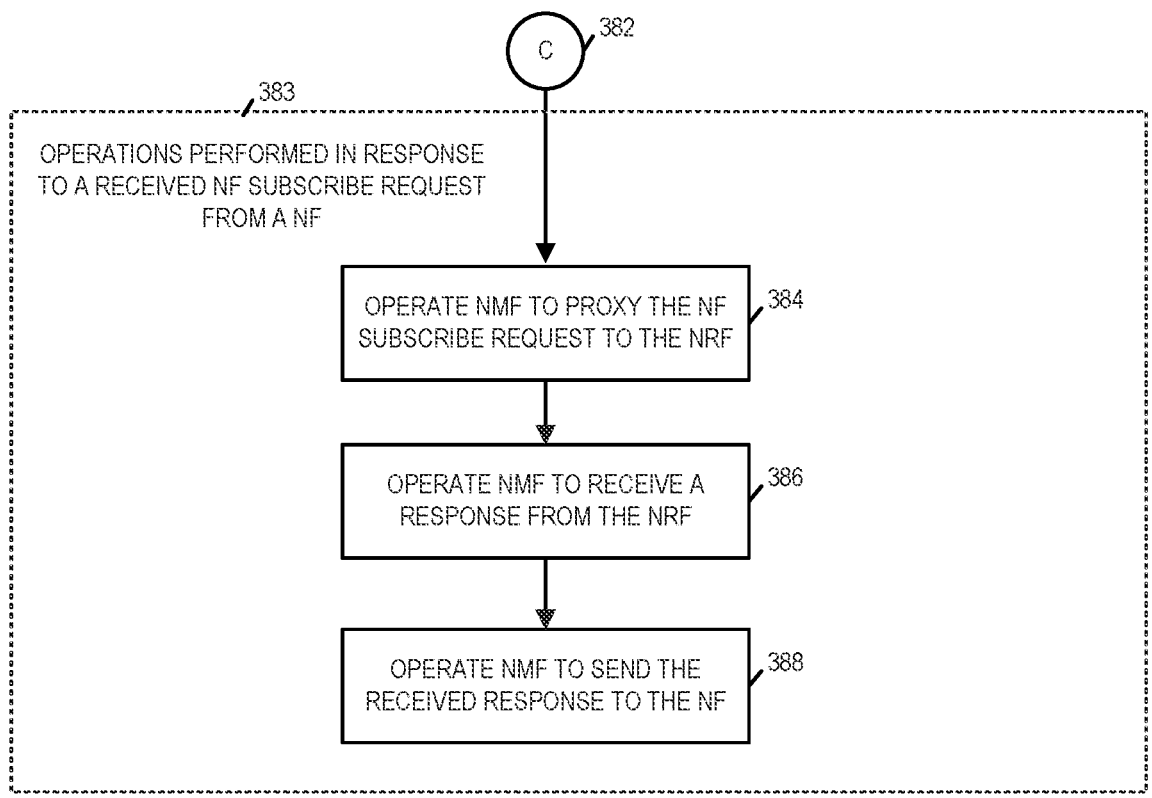
FIG. 3D is a fourth part of a flowchart of an exemplary method of operating a communications system in accordance with an exemplary embodiment, said fourth part of the flowchart including steps for operations performed by a NMF in response to a received subscribe request from a NF.

Returning to step 314 (See FIG. 3A), operation proceeds from step 314 (see FIG. 3A), via connecting node C 382 to step 384 (see FIG. 3D). In step 384, the NMF is operated to proxy the received NF subscribe request to the NRF. Operation proceeds from step 384 to step 386. In step 386 the NMF receives a response from the NRF. Operation proceeds from step 386 to step 388. In step 388 the NMF sends the received response to the NF. Steps 384, 386 and 388 may be considered a set of operations 383, performed, e.g., by the NMF, in response to a received NF subscribe request from a NF.

Figure 3E:
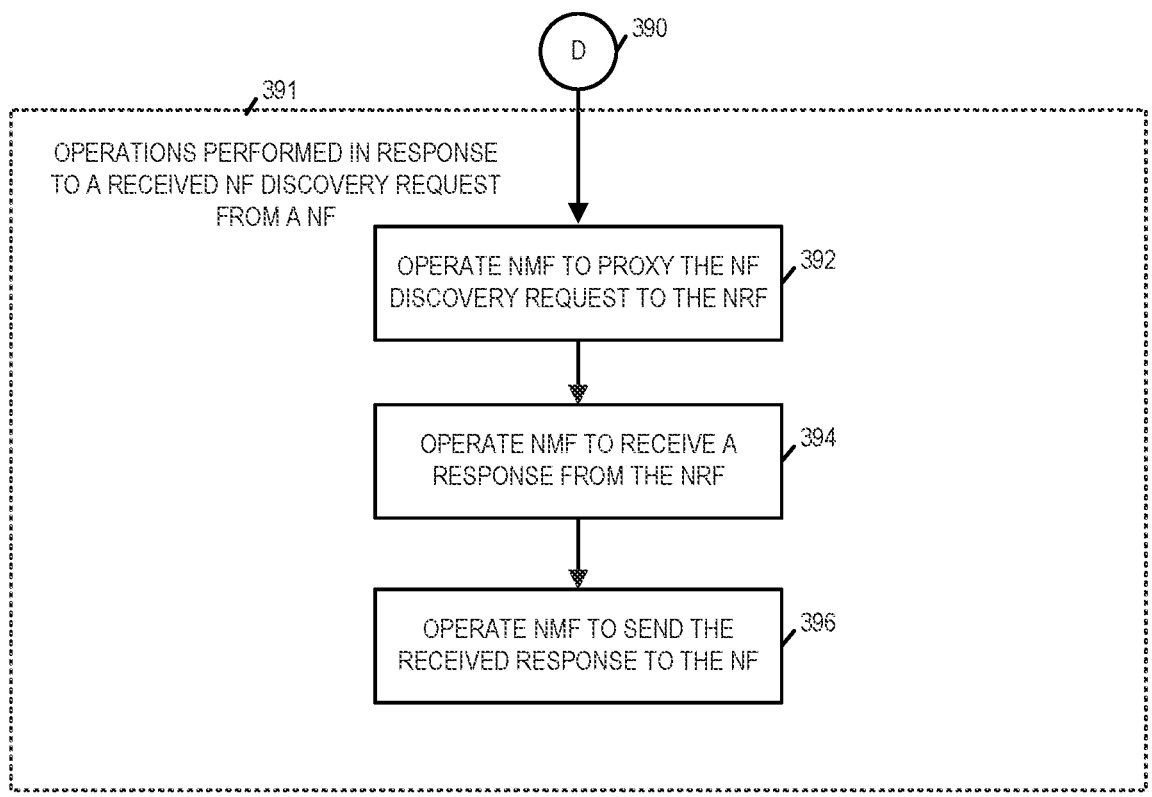
FIG. 3E is a fifth part of a flowchart of an exemplary method of operating a communications system in accordance with an exemplary embodiment, said fifth part of the flowchart including steps for operations performed by a NMF in response to a received NF discovery request from a NF.

Returning to step 316 (See FIG. 3A), operation proceeds from step 316 (see FIG. 3A), via connecting node D 390 to step 392 (see FIG. 3E). In step 392, the NMF is operated to proxy the received NF discovery request to the NRF. Operation proceeds from step 392 to step 394. In step 394 the NMF receives a response from the NRF. Operation proceeds from step 394 to step 396. In step 396 the NMF sends the received response to the NF. Steps 392, 394 and 396 may be considered a set of operations 391, performed, e.g., by the NMF, in response to a received NF discovery request, e.g., a Nnrf_NF Discovery Service Request, from a NF.

Figure 3F:
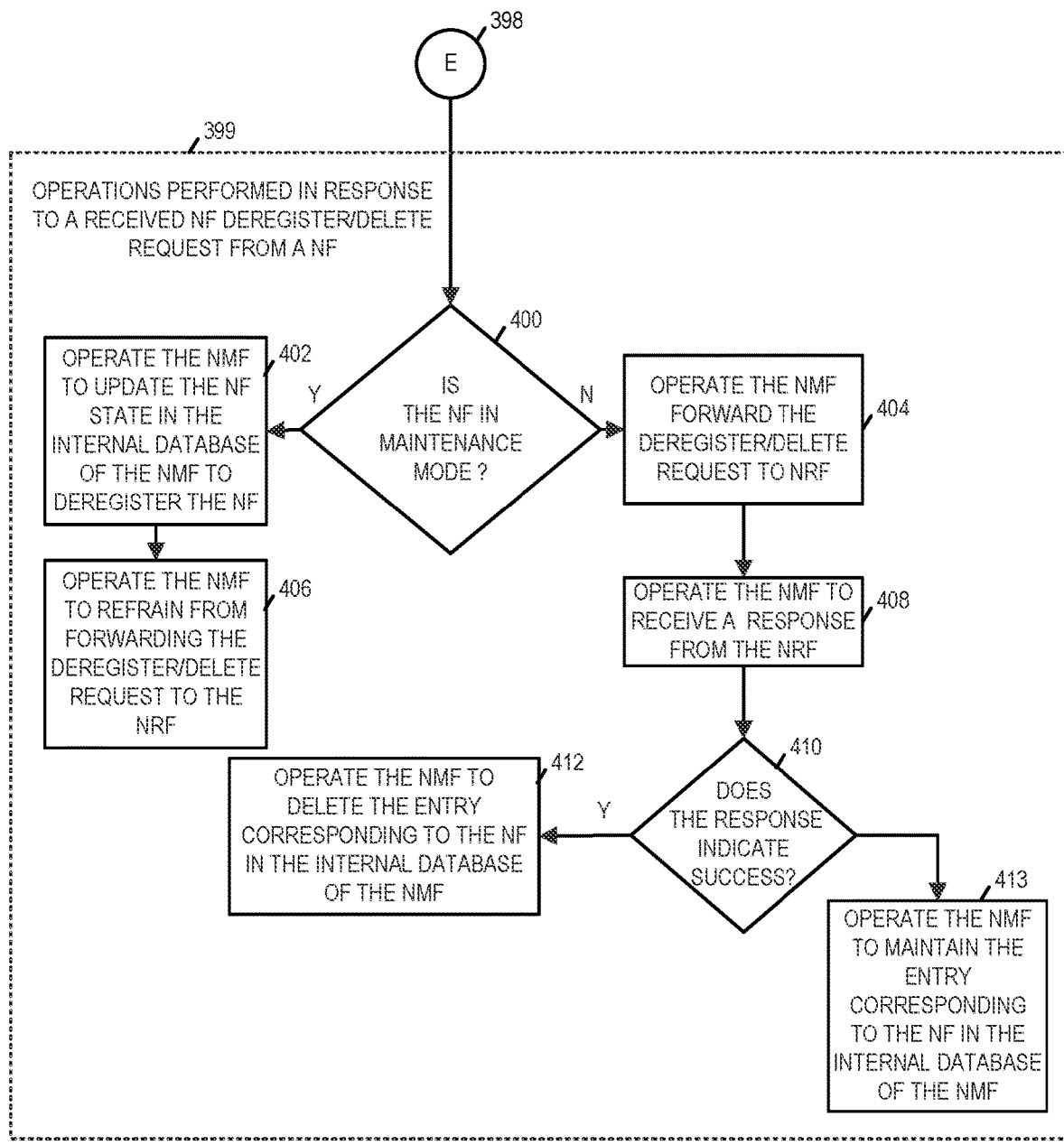
FIG. 3F is a sixth part of a flowchart of an exemplary method of operating a communications system in accordance with an exemplary embodiment, said sixth part of the flowchart including steps for operations performed by a NMF in response to a received NF deregister/delete request from a NF.

Returning to step 318 (See FIG. 3A), operation proceeds from step 318 (see FIG. 3A), via connecting node E 398 to step 400 (see FIG. 3F). In step 400 the NMF determines whether or not the NF, which sent the received NF deregister/delete request, is in maintenance mode on the database on the NMF. If the determination of step 400 is that the NF is not in maintenance mode (e.g., MM flag=0 for the NF indicating MM not enabled), then operation proceeds from step 400 to step 404; otherwise, the determination is that maintenance mode is enabled for the NF (e.g., MM flag=1 for the NF indicating MM is enabled) and operation proceeds from step 400 to step 402. In step 404 the NMF forwards the received deregistration/delete request to the NRF. Operation proceeds from step 404 to step 408. In step 408 the NMF receives a response from the NRF. Operation proceeds from step 408 to step 410. In step 410 the NMF determines whether or not the received response indicates success. If the response indicates success, then operation proceeds from step 410 to step 412. In step 412 the NMF deletes the entry corresponding to the NF in the internal database of the NMF. If the response does not indicate success, then operation proceeds from step 410 to step 413. In step 413 the NMF maintains the entry corresponding to the NF in the internal database of the NMF.

Returning to step 402, in step 402 the NMF updates the NF state in the internal database of the NMF to deregister the NF. Operation proceeds from step 402 to step 406. In step 406 the NFM is operated to refrain from forwarding the deregister/delete request to the NRF.

Steps 400, 402, 404, 406, 408, 410, 412 and 413 may be considered a set of operations 399, performed, e.g., by the NMF, in response to a received NF deregister/delete request from a NF.

Returning to step 306 (see FIG. 3A), step 306 includes step 307, in which the NMF receives a NF state change notification (for a NF) from the NRF, e.g., because of no heartbeat received by the NRF from the NF.

Figure 3G:
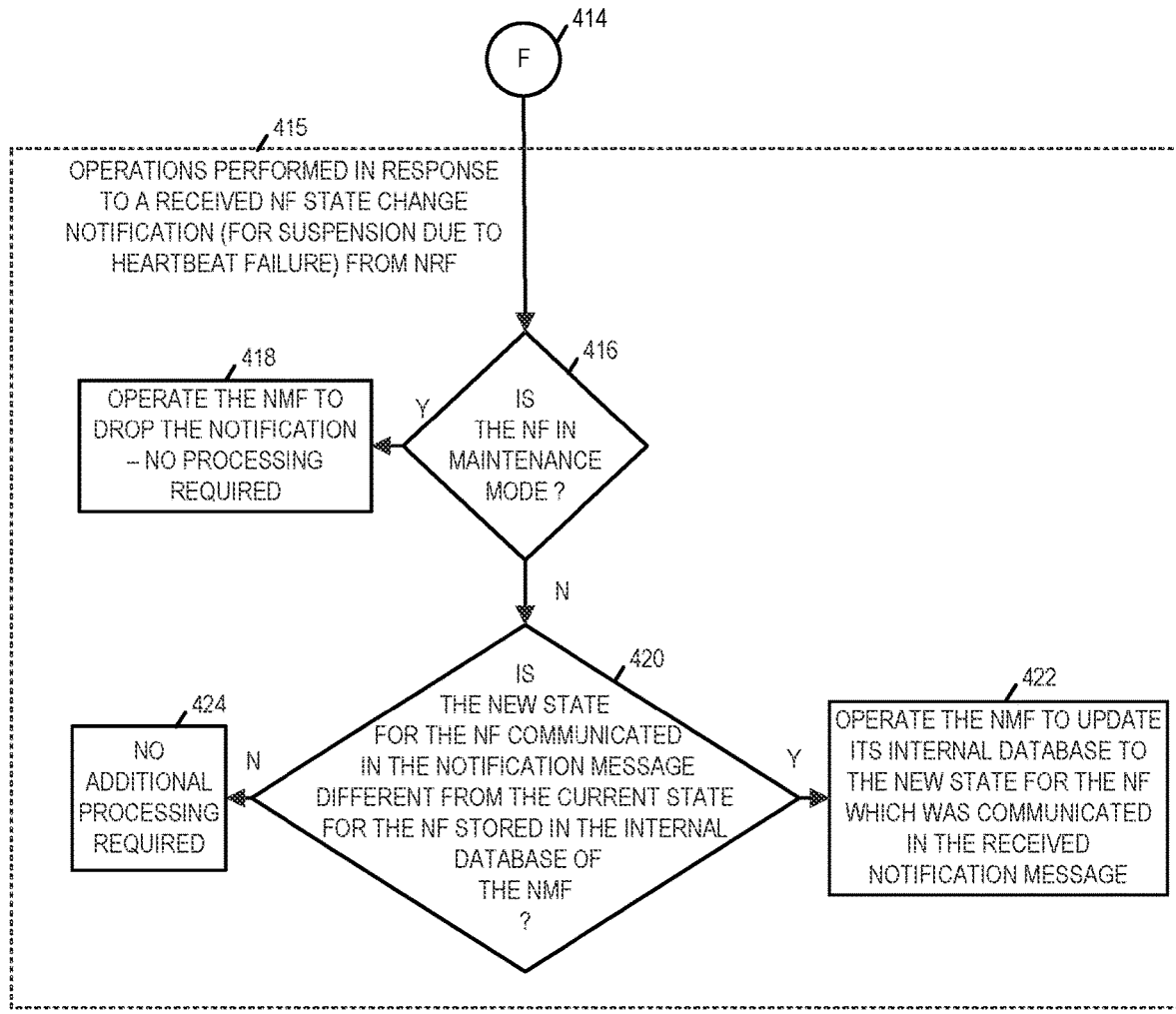
FIG. 3G is a seventh part of a flowchart of an exemplary method of operating a communications system in accordance with an exemplary embodiment, said seventh part of the flowchart including steps for operations performed by a NMF in response to a received NF state change notification (e.g., for suspension due to heartbeat failure) from a NRF.
Figure 3H:
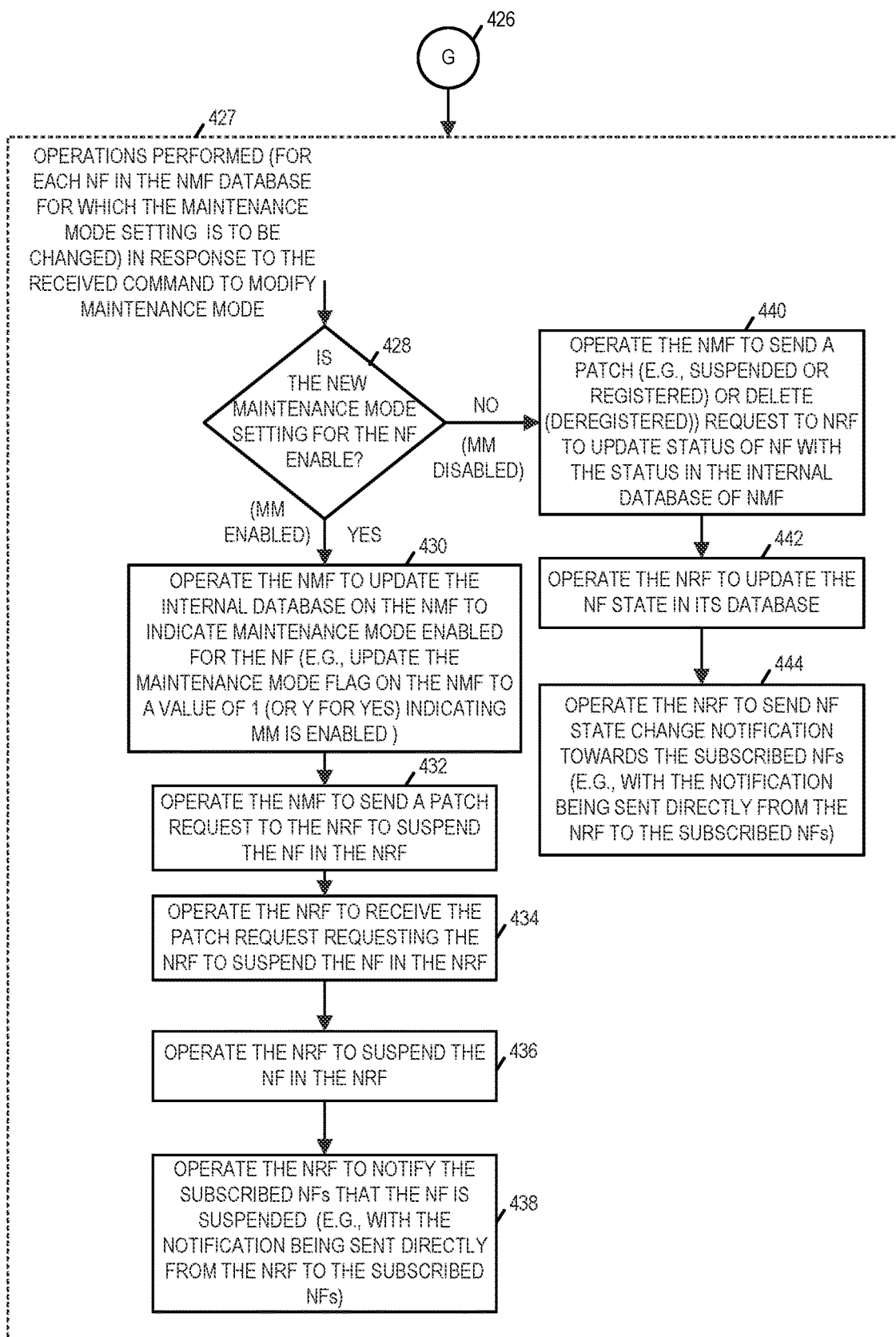
FIG. 3H is an eighth part of a flowchart of an exemplary method of operating a communications system in accordance with an exemplary embodiment, said eighth part of the flowchart including steps for operations performed in response to a received command to modify maintenance mode setting for a NF.

Operation proceeds from step 307, via connecting node F 414, to step 416 (see FIG. 3G). In step 416 the NMF determines whether or not the NF, corresponding to the NF state notification, is in maintenance mode in the database on the NMF. If the determination of step 416 is that the NF is not in maintenance mode in the database on the NMF (e.g., MM flag=0 for the NF, indicating MM not enabled), then operation proceeds from step 416 to step 420; otherwise, the determination is that the NF is in MM in the database on the NMF (e.g., MM flag=1 for the NF, indicating MM enabled) and operation proceeds from step 416 to step 418. In step 418 the NFM is operated to drop the notification, e.g., no processing required.

In step 420 the NMF compares the new state for the NF communicated in the notification message to the current state in the NMF database for the NF to determine if the new state for the NF communicated in the notification message is different from the current state for the NF stored in the internal database of the NMF. If the determination is that the communicated state for the NF from the received NF state change notification message is different from the current state stored in the NMF database, then operation proceeds from step 420 to step 422, in which the NMF updates its internal database to the new state for the NF obtained from the received notification message. Alternatively, if the determination is that the communicated state for the NF from the received NF state change notification message is not different from the current state stored in the NMF database, then operation proceeds from step 420 to step 424, in which the NMF determines that no additional processing is required in response to the received NF state change notification, e.g., since the state currently in the NMF for the NF already matches the new state communicated in the received notification message from the NFR.

Steps 416, 418, 420, 422 and 424 may be considered a set of operations 415 performed, e.g., by the NMF, in response to a received NF state change notification (e.g., for suspension due to heartbeat failure) from the NRF.

Returning to step 308 (see FIG. 3A), step 308 includes steps 309, 311, 313. Steps 309 and 311 correspond to alternative types of command messages which may be, and sometimes are, received during the monitoring of step 308. In step 309 the NMF receives a command indicating a new maintenance mode setting (enable or disable) for each of one or more identified NFs. For example, in step 309 the NMF receives a command indicating that new maintenance mode setting in the NFM 1 database 204 for the NF function instance designated UDR west 148 is to be maintenance mode enabled (e.g., MM flag value set to 1 for the NF UDR west 148), which is a change from its current setting of not enabled. In step 311 the NMF receives a command indicating a maintenance mode setting (enable or disable) to be implemented for a group of NFs (e.g., NFs corresponding to a geographic region). For example, in step 311 the NMF receives a command indicating a maintenance mode setting of maintenance mode enabled is to be implemented for the group of western region NFs (e.g., AMF west 142, AUSF west 144, UDM west 146, UDR west 148, PCF west 150, SMF west 1423, additional NF1 west 154, additional NFN1 west 156). Operation proceeds from step 311 to step 313. In step 313 the NMF identifies NFs from the group (e.g., regional group) for which the maintenance mode setting needs to be updated to satisfy the received command. For example, if the command of step 311 indicates a maintenance mode setting of maintenance mode enabled is to be implemented for the group of western region NFs, and some of the NFs in the group are already MM enabled, then a subset of the NFs in the western region are identified as needing their MM flag updated in the NMF database. However, if the command of step 311 indicates a maintenance mode setting of maintenance mode enabled is to be implemented for the group of western region NFs, and all of the NFs in the group are not maintenance mode enabled, then the full set of the NFs in the western region are identified as needing their MM flag updated in the NMF database. Operation proceeds from step 309 or step 313, via connecting node G 426, to step 427.

Step 427 is performed for each NF in the NMF database for which the maintenance mode setting is to be changed, in response to the received command to modify maintenance mode. Thus step 427 may be implemented multiple times, e.g., with one iteration corresponding to one identified NF (from information received in step 309 or from information from step 313) in the NMF database for which the MM setting is to be changed (updated).

Step 427 includes steps 428, 430, 432, 434, 436, 438, 440, 442 and 444. In step 428 the NMF determines if the new maintenance mode (MM) setting for the NF is to be enabled or disabled (not enabled). If the new MM setting for the NF is to be enabled (e.g., MM flag=1), then operation proceeds from step 428 to step 430; however, if the new MM for the NF is to be disabled (e.g., MM flag=0), then operation proceeds from step 428 to step 440.

In step 430 the NMF updates the internal database on the NMF to indicate maintenance mode enabled for NF (e.g., update the maintenance mode flag on the NMF to a value of 1 (or Y for yes) indicating that the NF is maintenance mode enabled. (For example, MM flag for the NF in the NMF changes from a value of 0 to a value of 1 as a result of step 430.) Operation proceeds from step 430 to step 432. In step 432 the NMF sends a patch request to the NRF to suspend the NF in the NRF. Operation proceeds from step 432 to step 434. In step 434 the NRF receives the patch request requesting the NRF to suspend the NF in the NRF. Operation proceeds from step 434 to step 436, in which the NRF suspends the NF in the NRF. (As a result of the state change for the NF to suspended, the NRF will not consider the suspended NF as a candidate to provide services in response to a received discovery request.) Operation proceeds from step 436 to step 438. In step 438 the NRF is operated to notify the subscribed NFs that the NF is suspended, e.g., with the notification being sent directly to the subscribed NFs.

Returning to step 440, in step 440 the NFM sends a PATCH (suspended or registered) or DELETE (deregistered) request to the NRF to update status of NF with the status of the internal database of the NMF. (Operation has proceeded to step 440 in response to a NF being taken out of maintenance mode enabled, and now that MM is disabled with regard to the NF, normal operations can resume and the NMF in step 440 pushes its currently stored state for the NF to the NRF). Operation proceeds from 440 to step 442, in which the NFR updates NF state in its database based on the information communicated in the received patch request of step 440, e.g., changing the state for the NF from suspended to registered. Operation proceeds from step 442 to step 444. In step 444 the NRF sends NF state change notification toward the subscribed NFs (e.g., with the notification being sent directly from the NRF to the subscribed NFs).

Figure 4:
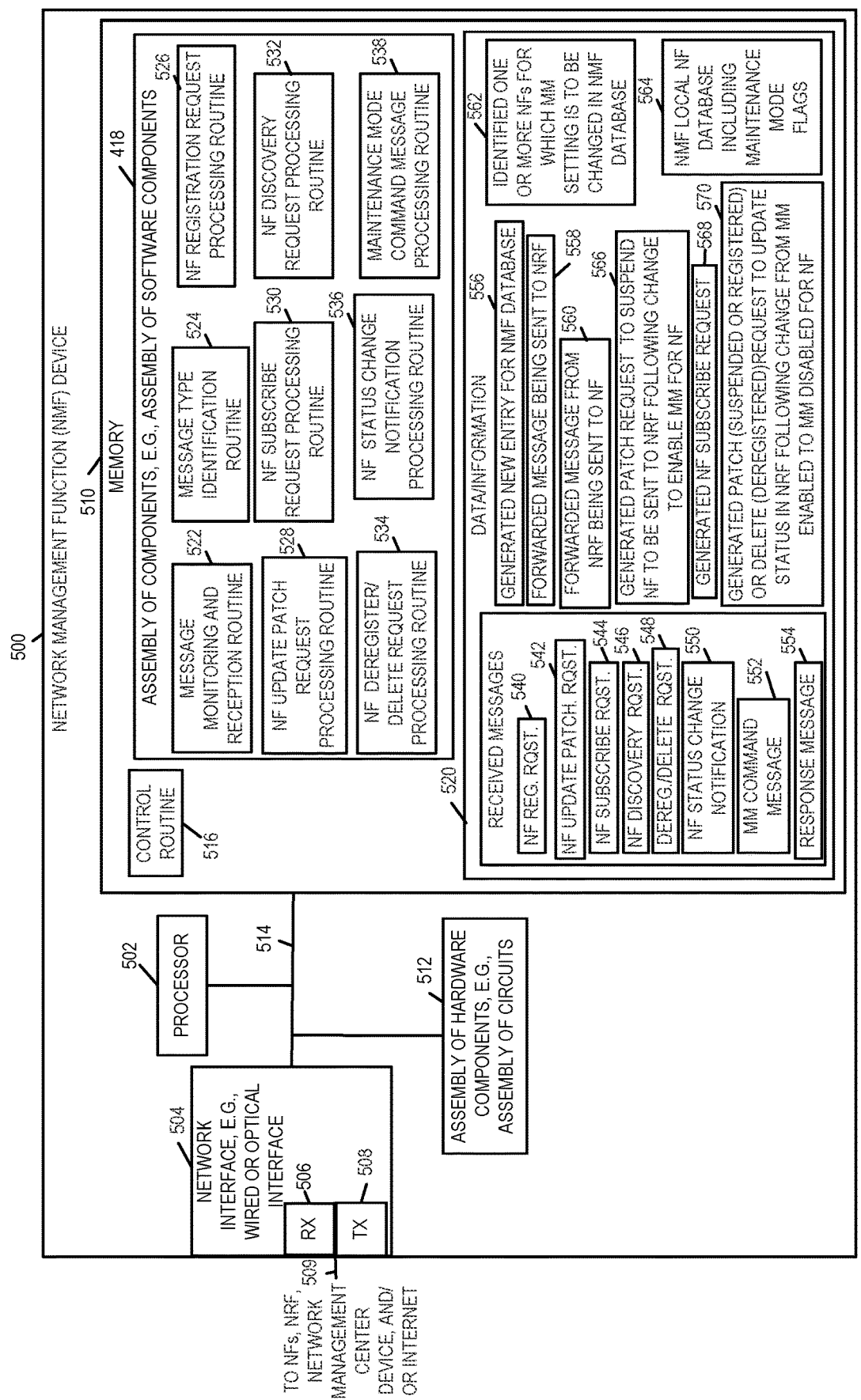
FIG. 4 is a drawing of an exemplary network management function (NMF) device in accordance with an exemplary embodiment.

FIG. 4 is a drawing of an exemplary network management function (NMF) device 500 in accordance with an exemplary embodiment. NMF device 500 is, e.g., any of the NMF 1 138, NMF 2 158 of system 100 of FIG. 1, and/or a NMF device implementing steps of the method of flowchart 300 of FIG. 3.

NMF device 500 includes a processor 502, e.g., a CPU, a network interface 504, memory 510, and assembly of hardware components 512, e.g., an assembly of circuits, coupled together via bus 514 over which the various elements may interchange data and information. Network interface 504, e.g., a wired or optical interface, includes receiver 506, transmitter 508 and connector 509. NMF device 500 sends messages to NFs, a NFR, a network management center device, and/or other devices via transmitter 508 and connector 509 and/or the Internet. NMF device 500 receives messages from NFs, a NFR, a network management center device, and/or other devices, via receiver 506 and connector 509 and/or the Internet.

Memory 510 includes a control routine 516, an assembly of components 518, e.g., an assembly of software components, and data/information 520.

Assembly of components 418 includes a message monitoring and reception routine 522, a message type identifier routine 524, a NF registration request processing routine 526, a NF update patch request processing routine 528, a NF subscribe request processing routine 530, a NF discovery request processing routine 532, a NF deregister/delete request processing routine 534, a NF status change notification processing routine 536, and a maintenance mode command message processing routine 538. Message monitoring and reception routine 522 includes code, e.g., machine executable instructions, which when executed by processor 502 control the NMF device 500 to implement steps shown or described with respect to FIG. 3A. NF registration request processing routine 526 includes code, e.g., machine executable instructions, which when executed by processor 502 control the NMF device 500 to implement steps shown or described with respect to FIG. 3B. NF update patch request processing routine 528 includes code, e.g., machine executable instructions, which when executed by processor 502 control the NMF device 500 to implement steps shown or described with respect to FIG. 3C. NF subscribe request processing routine 530 includes code, e.g., machine executable instructions, which when executed by processor 502 control the NMF device 500 to implement steps shown or described with respect to FIG. 3D. NF discovery request processing routine 532 includes code, e.g., machine executable instructions, which when executed by processor 502 control the NMF device 500 to implement steps shown or described with respect to FIG. 3E. NF deregister/delete request processing routine 534 includes code, e.g., machine executable instructions, which when executed by processor 502 control the NMF device 500 to implement steps shown or described with respect to FIG. 3F. NF status change notification processing routine 536 includes code, e.g., machine executable instructions, which when executed by processor 502 control the NMF device 500 to implement steps shown or described with respect to FIG. 3G. Maintenance mode command message processing routine 538 includes code, e.g., machine executable instructions, which when executed by processor 502 control the NMF device 500 to implement steps shown or described with respect to FIG. 3H.

Data/information 520 includes received messages 539 including a NF registration request message 540, a NF update patch request message 542, a NF subscribe request message 546, a deregistration/delete request message 548, a NF status change notification message 550, a maintenance mode (MM) command message 552, and a response message 554. Data/information 520 further includes a generated new entry for the NMF database 556, said generated new entry including information identifying the NF, NF status information and a MM flag set to indicate maintenance mode (MM) is not enabled for the NF (e.g., MM (1 bit) flag value (for the NF corresponding to the new entry)=0). Data/information 520 further includes a generated forwarded message (of a received message from a NF) to be sent to a NRF 558, and a generated forwarded message (of a received message from NRF) to be sent a NF 560. Data/information 520 further includes information 562 specifying identified one or more NFs for which the MM setting is to be changed in the NMF database 562, and a NMF local NF database including maintenance mode flags 564. Data/information 520 further includes a generated patch request to suspend NF to be sent to NRF following a change to enable MM (on the NMF database) for a NF in response to a received MM command message 566, a generated NF subscribe request 568, and a generated patch (suspended or registered) or delete (deregistered) request message to be sent to NRF to update status in NRF following an implemented change from MM enabled to MM disabled for NF 570.

Figure 5:
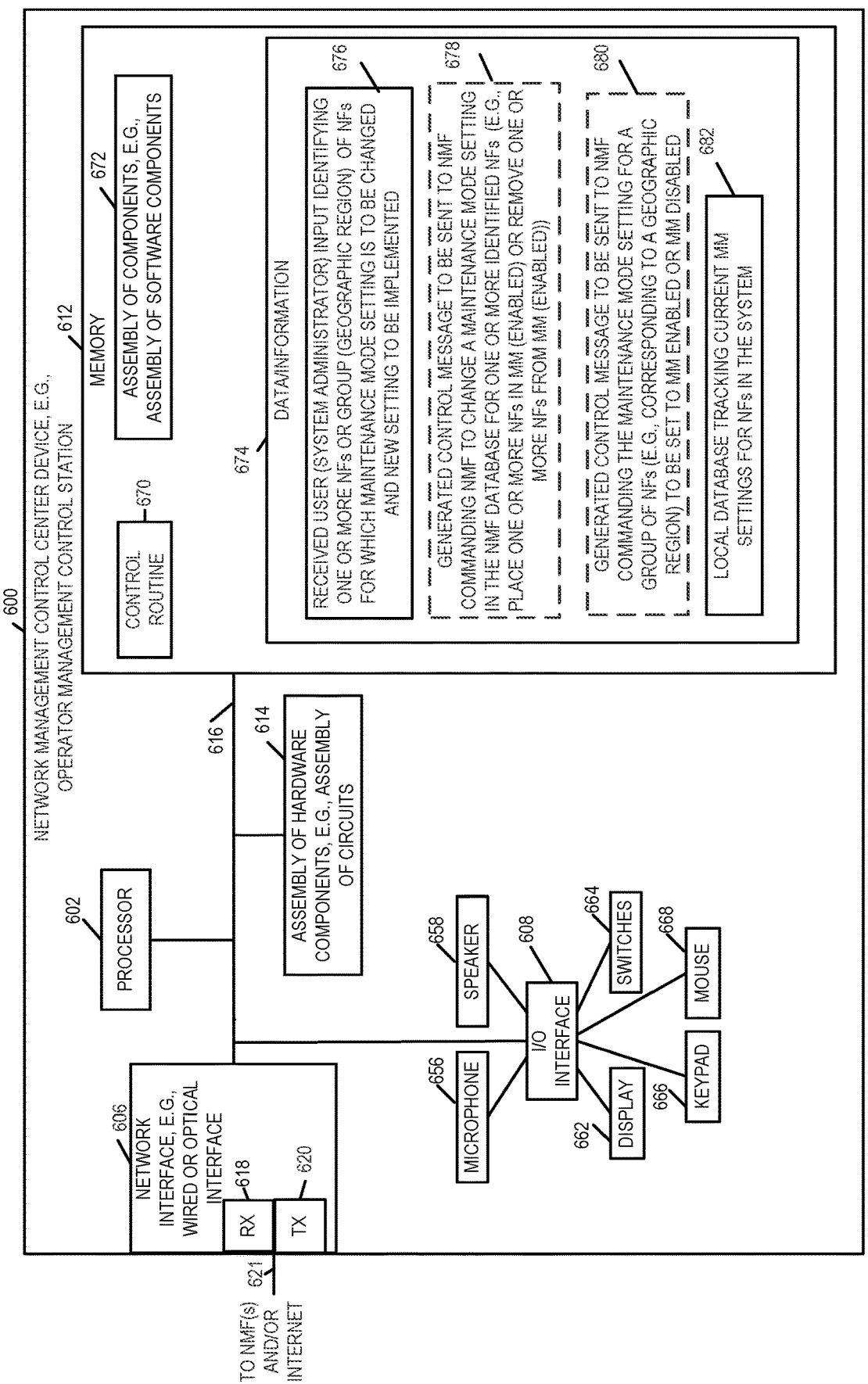
FIG. 5 is a drawing of an exemplary network management control center device, e.g., an operator management control station, in accordance with an exemplary embodiment.

FIG. 5 is a drawing of an exemplary network management control center device 800, e.g., an operator management control station, in accordance with an exemplary embodiment. Network management control center device 800 is, network management center device 180 of system 100 of FIG. 1, and/or a network management control center device implementing operations described with respect to steps of the method of flowchart 300 of FIG. 3.

Network management control center device 600 includes a processor 602, e.g., a CPU, a network interface 606, an I/O interface 608, memory 612, and an assembly of hardware components 614, e.g., an assembly of circuits, coupled together via bus 616 over which the various elements may interchange data and information. Network management control center device 600 further includes a plurality of I/O devices (microphone 656, speaker 658, display 662, e.g., a touch screen display, switches 664, keypad 666 and mouse 668 coupled to I/O interface 608, which couples the various I/O devices to other elements in device 600. Via an input device, e.g., a keypad 666, mouse 668, switch 664, microphone 658, or touch screen display 662, an operator, e.g. administrator, of the system, can select one or more NFs, or a set of NFs (e.g., a geographic grouping of NFs) to be commanded to change maintenance mode setting (e.g., enable MM for a NF or group of NFs or disable MM for a NF or group of NFs) in an NMF database and control the command to be sent to the NMF. An output device, e.g., display 662, displays the current maintenance mode settings for each of the NFs in the system and other information regarding the NFs, e.g., device ID information, services information, capability information, traffic information (e.g., loading), identified problems or issues, etc.

Network interface 606, e.g., a wired or optical interface, includes receiver 618, transmitter 620 and connector 621. Network management control center device 600 sends messages to NMF(s), and/other devices via transmitter 620 and connector 621 and/or the Internet. Network management control center device 600 receives messages from a NMF(s) and/or other devices, via receiver 618 and connector 621 and/or the Internet.

Memory 612 includes a control routine 670, an assembly of components 672, e.g., an assembly of software components, and data/information 674. Data/information 674 includes received user (e.g., system administrator) input 676 identifying one or more NFs or a group (e.g., geographic region) of NFs for which maintenance mode setting is to be changed and the new setting (MM enabled or MM disabled) to be implemented. Data/information 674 includes a generated control message, e.g., generated control message 678 to be sent to a NMF commanding the NMF to change a maintenance mode setting in the NMF database for one or more identified NFs (e.g., place one or more NFs in MM enabled or remove one or more NFs from MM enabled), or generated control message 680 to be sent to a NMF commanding the maintenance mode setting for a group of NFs (e.g., corresponding to a geographic region (e.g., west or east) to be set to maintenance mode enabled or set to maintenance mode disabled (not enabled)). Data/information 674 further includes a local database tracking the current maintenance mode setting for NFs in the system.

Figure 6:
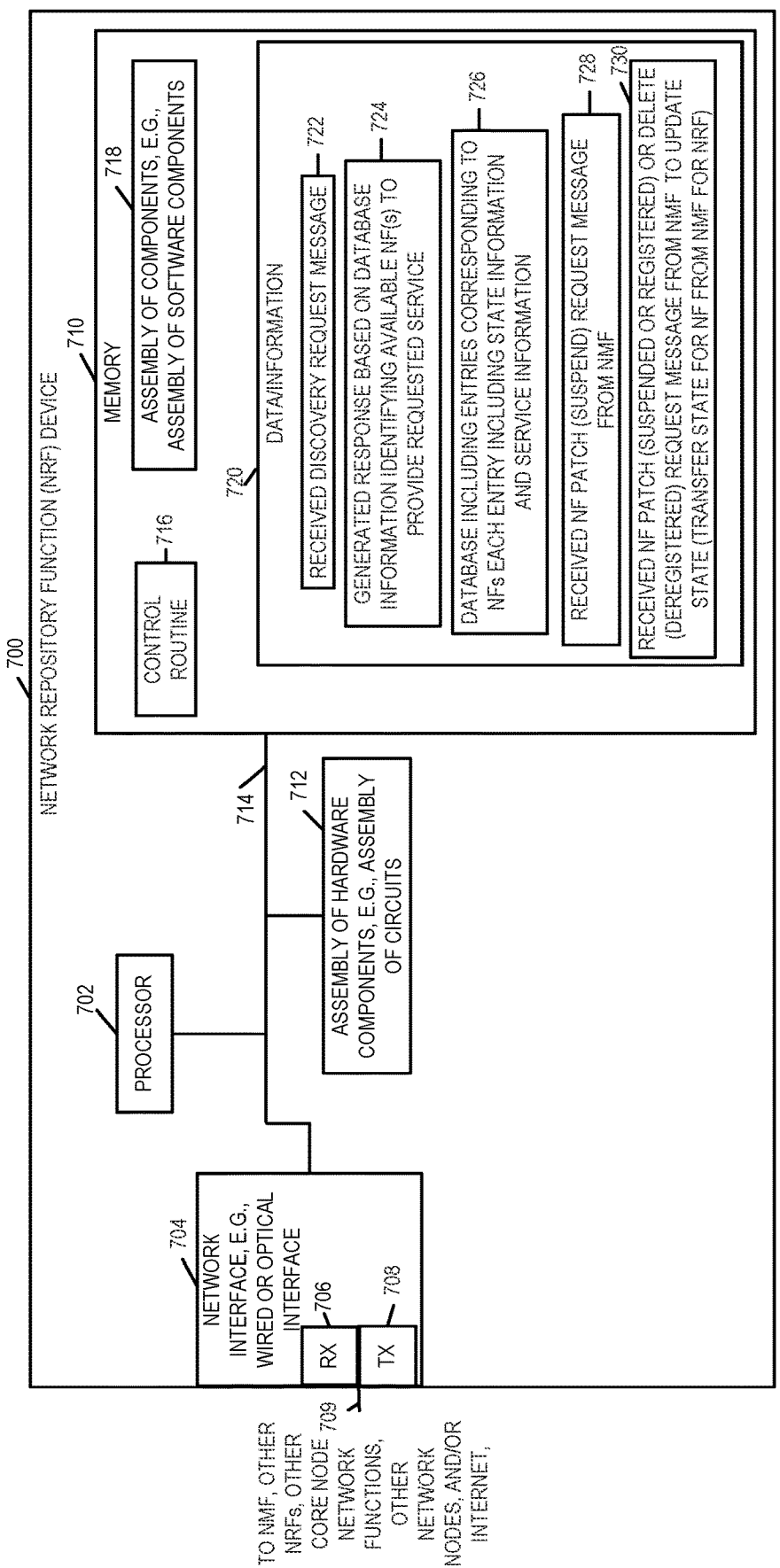
FIG. 6 is a drawing of an exemplary Network (function) Repository Function (NRF) device in accordance with an exemplary embodiment.

FIG. 6 is a drawing of an exemplary Network (function) Repository Function (NRF) device 700 in accordance with an exemplary embodiment. NRF device 700 is, e.g., any of the NRF west 1 140, NRF east 160 of system 100 of FIG. 1, and/or a NRF device implementing steps or described with respect to steps of the method of flowchart 300 of FIG. 3.

NRF device 700 includes a processor 702, e.g., a CPU, a network interface 704, memory 710, and an assembly of hardware components 712, e.g., an assembly of circuits, coupled together via bus 714 over which the various elements may interchange data and information. Network interface 704, e.g., a wired or optical interface, includes receiver 706, transmitter 708 and connector 709. NRF device 700 sends messages to a NMF, other NRFs, other core network functions, other network nodes, and/other devices via transmitter 708 and connector 709 and/or the Internet. NRF device 700 receives messages from a NMF, other NRFs, other core network functions, other network nodes, and/or other devices, via receiver 706 and connector 709 and/or the Internet.

Memory 710 includes a control routine 716, an assembly of components 718, e.g., an assembly of software components, and data/information 720.

Data/information 720 includes a received discovery request message 722, a generated response message 724 based on database information identifying available NF(s) to provide the requested service, a database 726 including entries corresponding to NFs, each entry including state information and service information, a received NF patch (suspended) request message 728 from NMF, which was sent by the NMF in response to maintenance mode being enabled for a NF, and a received NF Patch (suspended or registered) or delete (deregistered) request message 730 from the NMF which was sent by the NMF to update state (e.g., transfer state for NF(s) from NMF to NRF) following maintenance mode being disabled for a NF.

Figure 7:
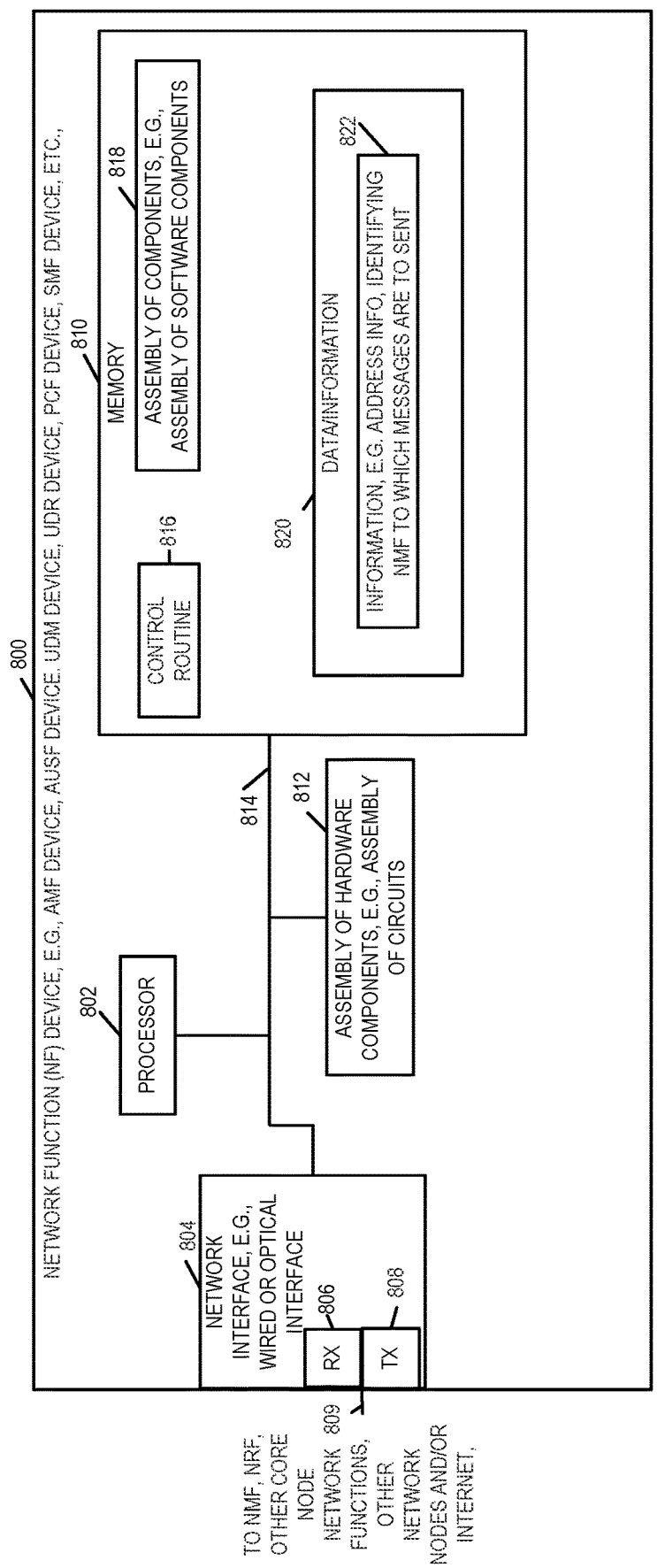
FIG. 7 is a drawing of an exemplary Network Function (NF) device in accordance with an exemplary embodiment.

FIG. 7 is a drawing of an exemplary Network Function (NF) device 800 in accordance with an exemplary embodiment. NF device 800 is, e.g., any of the NFs (AMF west 142, AUSF west 144, UDM west 146, UDR west 148, PCF west 150, SMF west 152, additional NF1 west 154, additional NFN1 west 156, AMF east 162, AUSF east 164, UDM east 166, UDR east 168, PCF east 170, SMF east 172, additional NF1 east 174, additional NFN2 east 176, of system 100 of FIG. 1, and/or a NF device implementing described with respect to steps of the method of flowchart 300 of FIG. 3.

NF device 800 includes a processor 802, e.g., a CPU, a network interface 804, memory 810, and an assembly of hardware components 812, e.g., an assembly of circuits, coupled together via bus 814 over which the various elements may interchange data and information. Network interface 804, e.g., a wired or optical interface, includes receiver 806, transmitter 808 and connector 809. NF device 800 sends messages to a NMF, NRF, other core network functions, other network nodes, and/other devices via transmitter 808 and connector 809 and/or the Internet. NF device 800 receives messages from a NMF, a NRF, other core network functions, other network nodes, and/or other devices, via receiver 806 and connector 809 and/or the Internet.

Memory 810 includes a control routine 816, an assembly of components 818, e.g., an assembly of software components, and data/information 820. Data/information 820 includes information 822, e.g., address information, identifying the NMF to which messages are to be sent.

Data/information 720 includes a received discovery request message 722, a generated response message 724 based on database information identifying available NF(s) to provide the requested service, a database 726 including entries corresponding to NFs, each entry including state information and service information, a received NF patch (suspended) request message 728 from NMF, which was sent by the NMF in response to maintenance mode being enabled for a NF, and a received NF Patch (suspended or registered) or delete (deregistered) request message 730 from the NMF which was sent by the NMF to update state (e.g., transfer state for NF(s) from NMF to NRF) following maintenance mode being disabled for a NF.

Figure 8:
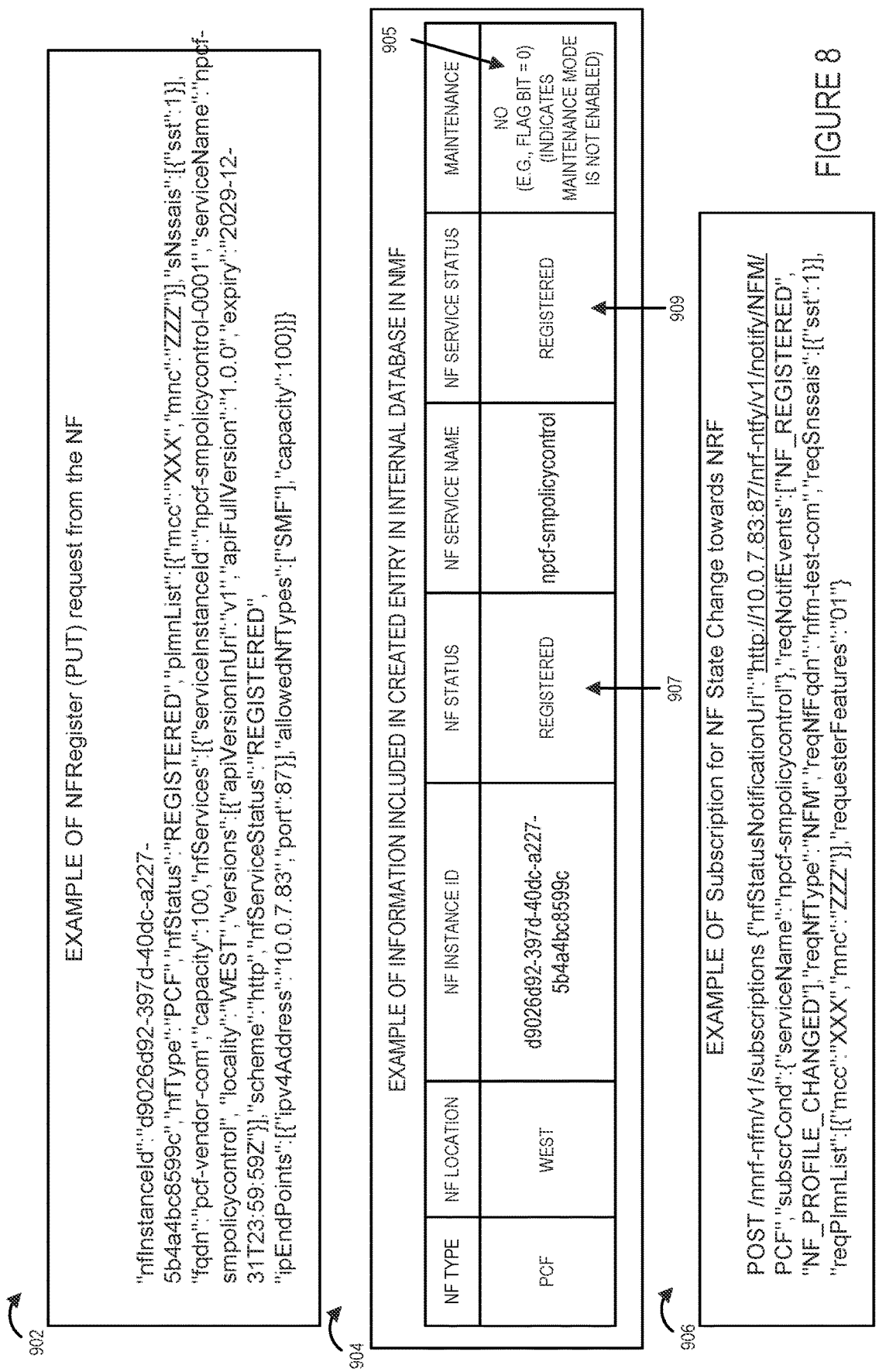
FIG. 8 illustrates exemplary messages and NMF database information for an example in which a NMF, receives and processes a Register (PUT) request from a NF in accordance with an exemplary embodiment, said processing including creating a new entry into the NMF database including a maintenance mode flag set to indicate that maintenance mode (MM) is not enabled for the NF and subsequently subscribing to the NRF for any status changes for the NF towards the NRF.

FIG. 8 illustrates an example in which a NMF, e.g., NMF 1 138, receives and processes a NFRegister (PUT) request 902 from a NF, e.g., PCF west 150, in accordance with an exemplary embodiment. Consider that the reception of the NFResgister (PUT) request 902 occurs in step 310 of flowchart 300 of FIG. 3A, the NMF determines (in step 322 of FIG. 3B) that the NF is not in the database on the NMF, and operation proceeds to step 326 in which the NMF creates an entry in the NMF database for the NF and includes information from the received registration request. As part of creating the entry in the database, the NMF performs step 327, in which the NMF sets the maintenance mode indication, e.g., flag, in the entry in the database to a value, e.g., 0, indicating that maintenance mode is not enabled for the NF. Block 904 illustrates information included in a created entry in the internal database in the NMF, e.g., in NMF 1 local database 204, said created entry including the maintenance mode flag set to a value of 0 to indicate the maintenance mode is not enabled for the NF (see block 905). Consider that the received registration request is forwarded to the NRF, which sends back a success response. Subsequently, in step 356 the NMF subscribes to the NRF for any status changes for the NF to the NRF. Block 906 is an example of Subscription for NF state change towards NRF.

Figure 9:
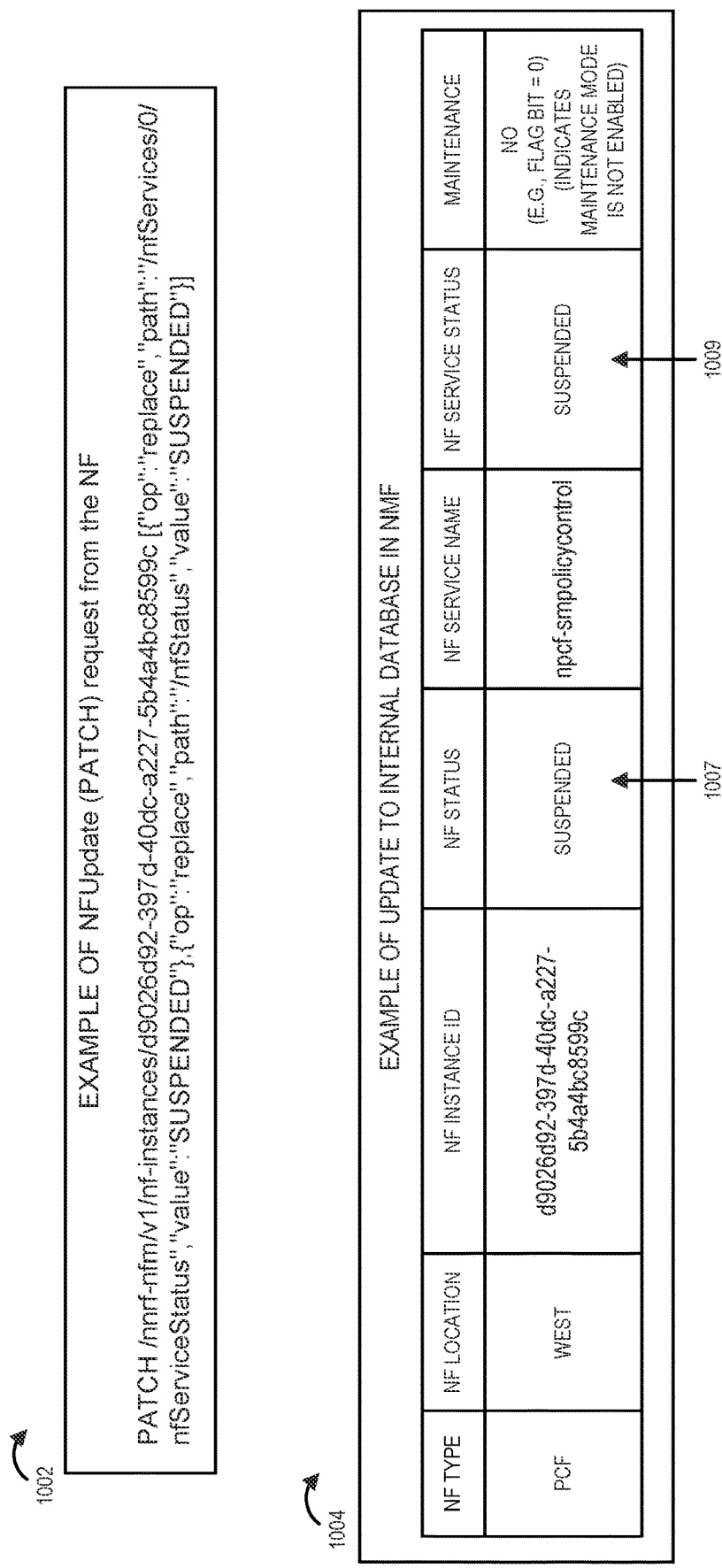
FIG. 9 illustrates exemplary messages and NMF database information for an example in which a NMF receives and processes a NF Update (PATCH) request from a NF, in accordance with an exemplary embodiment.

FIG. 9 illustrates an example in which a NMF, e.g., NMF 1 138, receives and processes a NF Update (PATCH) request 1002 from a NF, e.g., PCF west 150, in accordance with an exemplary embodiment. For this example, consider that the NMF database includes information of block 904 of FIG. 8. Consider that the reception of the NF Update (PATCH) request 1002 occurs in step 312 of flowchart 300 of FIG. 3A, the NMF determines (in step 364 of FIG. 3C) that the NF is in the database on the NMF, and operation determines (in step 366 of FIG. 3C) that the NF in the database in the NMF is not marked for maintenance mode (based on information in block 904 of entry 904), and operation proceeds to step 374 in which the NMF updates the status of the NF in the internal database on the NMF. The NF Update Patch Request 1002 specifies that the nfServiceStatus value should be replaced with "SUSPENDED" and the nfStatus value should be replaced with "SUSPENDED". Block 1104 illustrates information included in the updated entry in the internal database in the NMF, e.g., in NMF 1 local database 204, said updated entry including "SUSPENDED" (see block 1007) for NF status and "SUSPENDED" (see block 1009) for NF service status. Note that this is a change from the "REGISTERED" (see block 907 of information 1004 of FIG. 9) for NF status and "REGISTERED" (see block 909 of information 1004 of FIG. 9) for NF service status.

Figure 10:
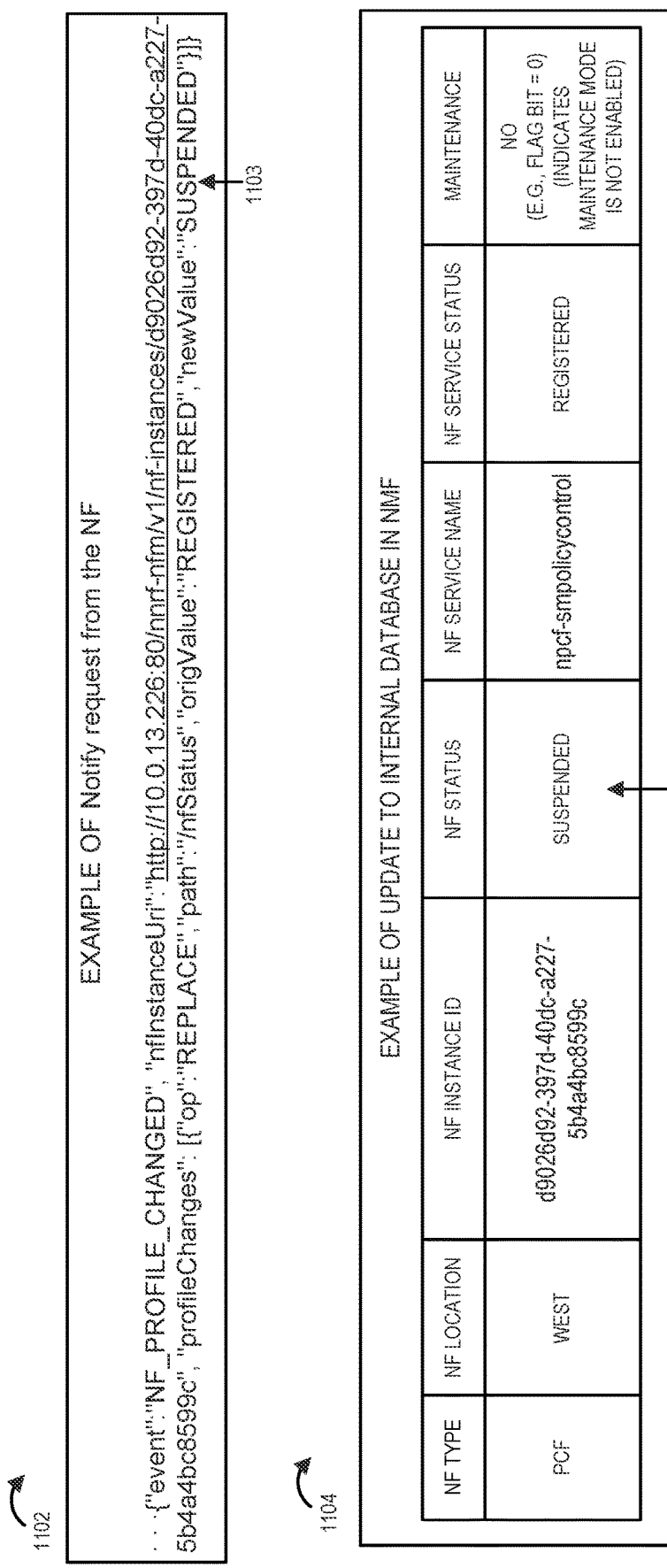
FIG. 10 illustrates exemplary messages and NMF database information for an example in which a NMF receives and processes a NF state change Notification (sometimes referred to as a Notify request) from a NRF, e.g. for NF status change due to no heartbeat received.

FIG. 10 illustrates an example of a NF state change Notification (sometimes referred to as a Notify request) from a NRF (e.g., NRF west 140) which is received by a NMF (e.g., NMF 1 138). For this example, consider that the NMF database includes information of block 904 of FIG. 8. Consider that the reception of the NF Notify request (sometimes referred to as a status change notification) 1102 occurs in step 307 of flowchart 300 of FIG. 3A. Operation proceeds to step 414 of FIG. 3G, in which the NMF determines that the NF is not in maintenance mode (see indication in block 905 of FIG. 8). Operation proceeds to step 420, in which the NMF determines the new value for nfStaus in the received message, which is "SUSPENDED" (1103) does not match the current value for the nfStatus in the NMF database, which is "REGISTERED" (see block 907 of FIG. 8). Therefore, operation proceeds from step 420 to step 422, in which the NMF updates its internal database to the new state for the NF which was communicated in the received notification message. Block 1104 illustrates information included in the updated entry in the internal database in the NMF, e.g., in NMF 1 local database 204, said updated entry including "SUSPENDED" (see block 1007) for NF status. Note that this is a change from the "REGISTERED" (see block 907 of information 1004 of FIG. 9) for NF status.

Figure 11:
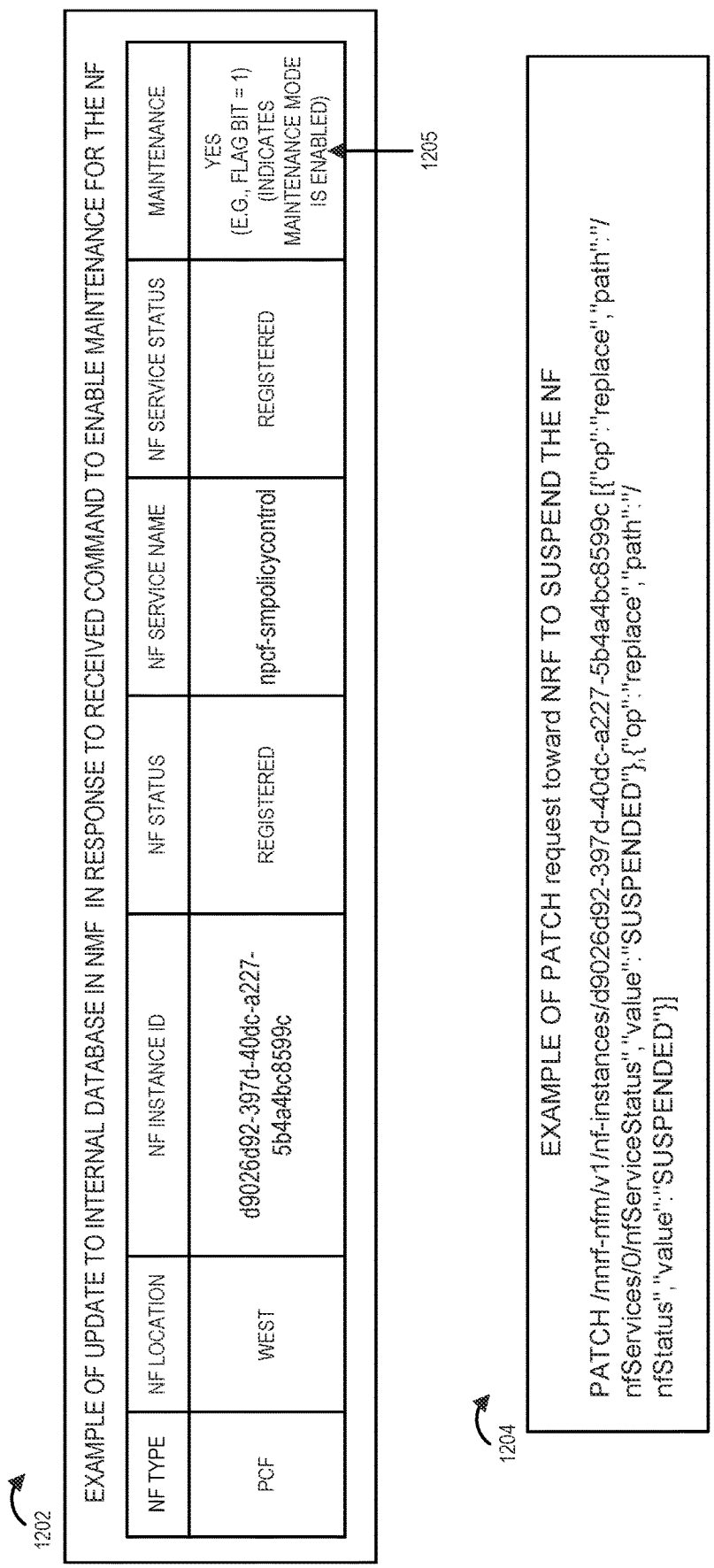
FIG. 11 illustrates exemplary NMF database information and an exemplary message for an example of enabling maintenance mode for a NF.

FIG. 11 illustrates an example of enabling maintenance mode for a NF, e.g., PCF west 150. For this example, consider that the NMF database includes information of block 904 of FIG. 8. In step 309 of FIG. 3A, the NMF, e.g., NMF 1 138, receives a command indicating that the maintenance mode for PCF west 150 is to be changed to maintenance mode enabled. Operation proceeds to step 428, in which the NMF determines the new maintenance mode setting is to be maintenance mode enabled, and operation proceeds to step 430, in which the NMF updates the internal database on the NMF to indicate maintenance mode enabled for the NF (which is the identified instance of PCF west). Block 1202 illustrates information included in the updated entry in the internal database in the NMF, e.g., in NMF 1 local database 204, said updated entry including the maintenance mode now set to enabled (e.g., Y (yes MM is enabled) and MM flag bit set to 1 indicating maintenance mode is enabled for the NF), as indicated by block 1205. Note that this is a change from the maintenance mode "not enabled" indication (e.g., N (MM is not enabled) and flag bit set to 0) in block 905 of information 904 of FIG. 8. Subsequently, in step 432 the NMF sends a patch request to the NRF to suspend the NF in the NRF. Block 1204 includes the exemplary PATCH request, which is generated and sent by the NMF to the NRF, e.g., NRF west 140, to suspend the NF.

Figure 12:
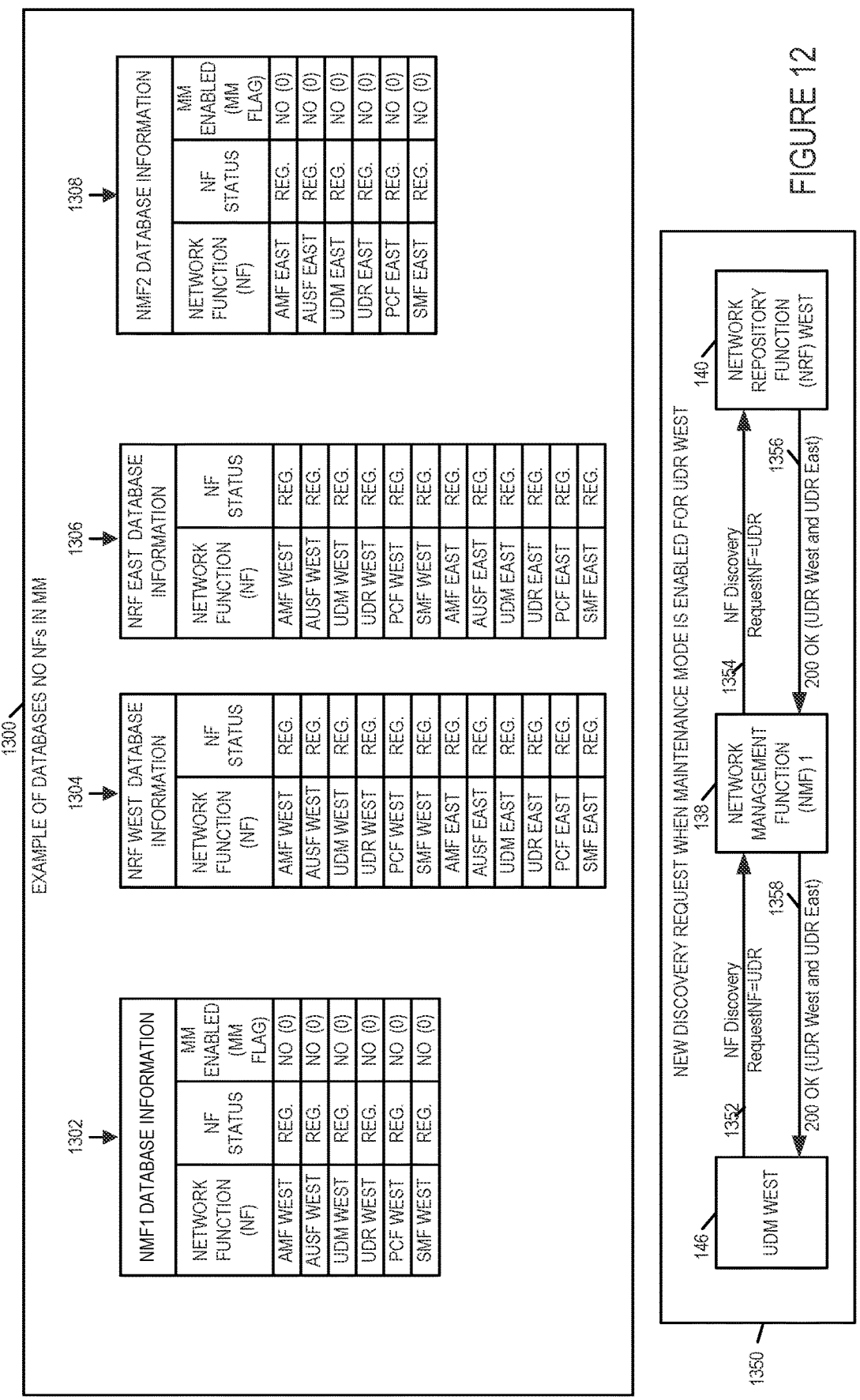
FIG. 12 illustrates exemplary databases and exemplary discovery request and response message signaling for an example in which there are no NFs in maintenance mode.

FIG. 12 illustrates exemplary databases and exemplary discovery request and response message signaling for an example in which there are no NFs in maintenance mode. Box 1300 illustrates exemplary databases for an example in which no NFs are in maintenance mode. Network Management Function 1 (NMF1) database information 1302 includes information included in NMF1 database 204 of NMF1 138. Network Management Function 2 (NMF2) database information 1308 includes information included in NMF2 database 208 of NMF2 158. NRF west database information 1304 includes information included in NRF west database 202 of NRF west 140. NRF east database information 1306 includes information included in NRF database 206 of NRF east 160.

Network Management Function 1 (NMF1) database information 1302 indicates that for each of the Network Function (NFs) (AMF west 142, AUSF west 144, UDM west 146, UDR west 148, PCF west 150, SMF west 152), NF status=registered (REG.), maintenance mode is not enabled, and the maintenance mode flag bit is set to 0. Network Management Function 2 (NMF2) database information 1308 indicates that for each of the Network Function (NFs) (AMF east 162, AUSF east 164, UDM east 166, UDR 168, PCF east 170, SMF east 172), NF status=registered (REG.), maintenance mode is not enabled, and the maintenance mode flag bit is set to 0 (indicating MM not enabled). NFR west database information 1304 indicates that for each of the Network Function (NFs) (AMF west 142, AUSF west 144, UDM west 146, UDR west 148, PCF west 150, SMF west 152, AMF east 162, AUSF east 164, UDM east 166, UDR 168, PCF east 170, SMF east 172), NF status=registered (REG.). NFR east database information 1306 indicates that for each of the Network Function (NFs) (AMF west 142, AUSF west 144, UDM west 146, UDR west 148, PCF west 150, SMF west 152, AMF east 162, AUSF east 164, UDM east 166, UDR 168, PCF east 170, SMF east 172), NF status=registered (REG.).

FIG. 12 further includes block 1350 which illustrates an exemplary new discovery request when no NFs are in maintenance mode (enabled). UDM west 146 generates and sends a NF Discovery RequestNF=UDR message 1352 to NMF 1 138, which receives message 1352, and proxies the NF Discovery RequestNF=UDR message, as message 1354 to the NRF west 140. The NRF 140 receives message 1354, checks its database, determines that both UDR west and UDR east are listed in its database with NF status=Registered and both can support the services requested, generates 200 OK (UDR east and UDR west) response message 1356 and sends response message 1356 to NMF 1 138. NMF 1 138 receives the 200 OK (UDR west and UDR east) response message 1356 and proxies the message as 200 OK (UDR west and UDR east) response message 1358 to UDM west 146 which receives message 1358 and recovers the communicated information. Traffic can be sent to either UDR west or UDR east, e.g., at the discretion of UDM west.

Figure 13:
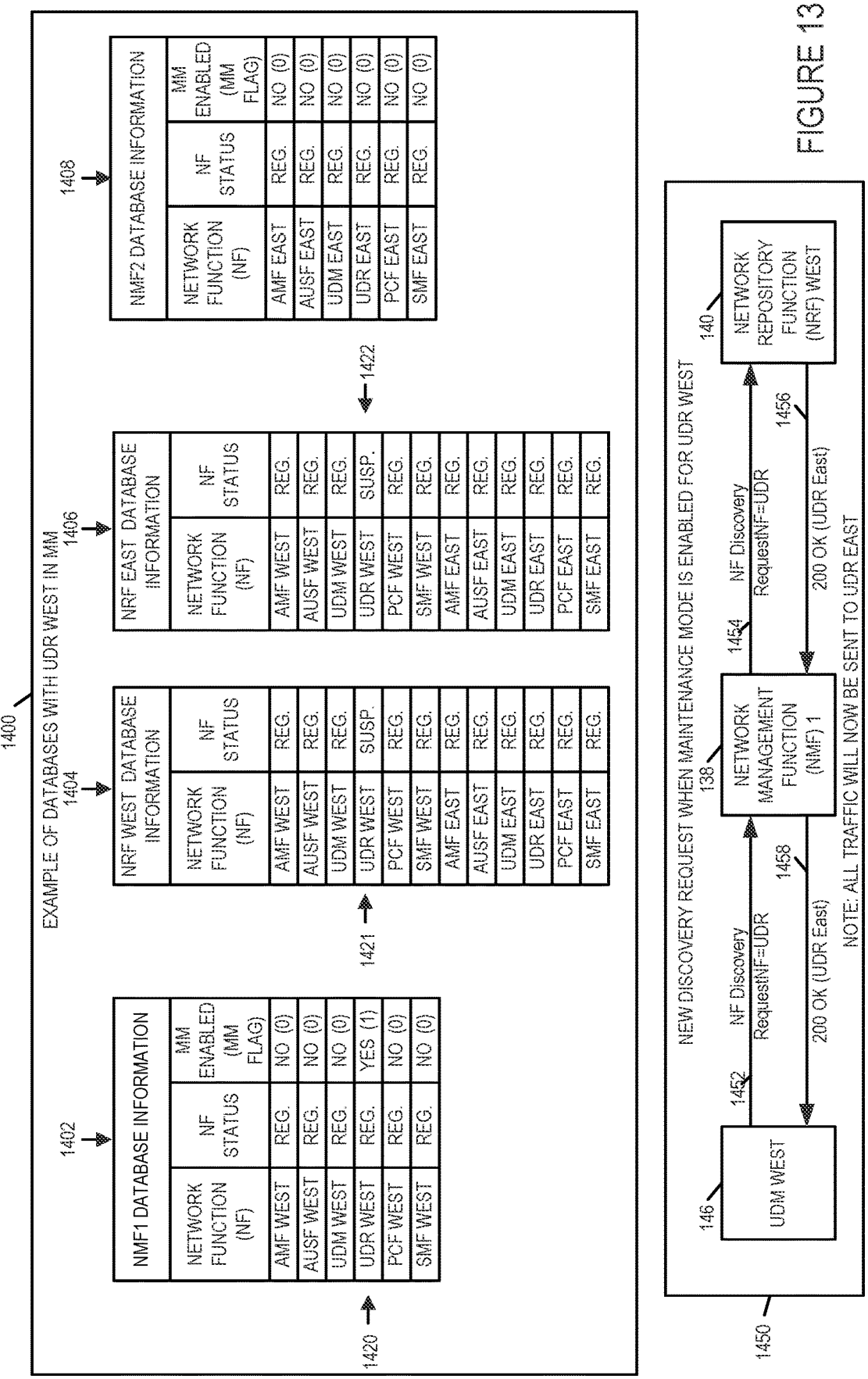
FIG. 13 illustrates exemplary databases and exemplary discovery request and response message signaling for an example in which there is one NF in maintenance mode.

FIG. 13 illustrates exemplary databases and exemplary discovery request and response message signaling for an example in which there is one NF in maintenance mode. Box 1400 illustrates exemplary databases for an example in which one NF (UDR west) is in maintenance mode. Network Management Function 1 (NMF1) database information 1402 includes information included in NMF1 database 204 of NMF1 138. Network Management Function 2 (NMF2) database information 1408 includes information included in NMF2 database 208 of NMF2 158. NRF west database information 1404 includes information included in NRF west database 202 of NRF west 140. NRF east database information 1406 includes information included in NRF database 206 of NRF east 160.

Network Management Function 1 (NMF1) database information 1402 indicates that for each of the Network Function (NFs) (AMF west 142, AUSF west 144, UDM west 146, PCF west 150, SMF west 152), NF status=registered (REG.), maintenance mode is not enabled, and the maintenance mode flag bit is set to 0. Network Management Function 1 (NMF1) database information 1402 further indicates that for the Network Function UDR west 148, NF status=registered (REG.), maintenance mode is enabled, and the maintenance mode flag bit is set to 1, as indicated by row 1420.

Network Management Function 2 (NMF2) database information 1408 indicates that for each of the Network Function (NFs) (AMF east 162, AUSF east 164, UDM east 166, UDR 168, PCF east 170, SMF east 172), NF status=registered (REG.), maintenance mode is not enabled, and the maintenance mode flag bit is set to 0 (indicating MM not enabled).

NFR west database information 1404 indicates that for each of the Network Functions (NFs) (AMF west 142, AUSF west 144, UDM west 146, UDR west 148, PCF west 150, SMF west 152, AMF east 162, AUSF east 164, UDM east 166, PCF east 170, SMF east 172), NF status=registered (REG.). NFR west database information 1404 further indicates that for NF UDR west 148 NF status=suspended, as indicated by row 1421. NFR east database information 1406 indicates that for each of the Network Functions (NFs) (AMF west 142, AUSF west 144, UDM west 146, UDR west 148, PCF west 150, SMF west 152, AMF east 162, AUSF east 164, UDM east 166, PCF east 170, SMF east 172), NF status=registered (REG.). NFR east database information 140 further indicates that for NF UDR west 148 NF status=suspended, as indicated by row 1422.

FIG. 13 further includes block 1450 which illustrates an exemplary new discovery request when maintenance mode is enabled for UDR west 148. UDM west 146 generates and sends a NF Discovery RequestNF=UDR message 1452 to NMF 1 138, which receives message 1452, and proxies the NF Discovery RequestNF=UDR message, as message 1454 to the NRF west 140. The NRF 140 receives message 1454, checks its database, determines that UDR east is listed in its database with NF status=Registered and can support the services requested (note UDR west is listed in its database with NF status=Suspended and is therefore removed from consideration), generates 200 OK (UDR east) response message 1456 and sends response message 1456 to NMF 1 138. NMF 1 138 receives the 200 OK (UDR east) response message 1456 and proxies the message as 200 OK (UDR east) response message 1458 to UDM west 146 which receives message 1458 and recovers the communicated information. All traffic will no be sent to UDR east.

Figure 14:
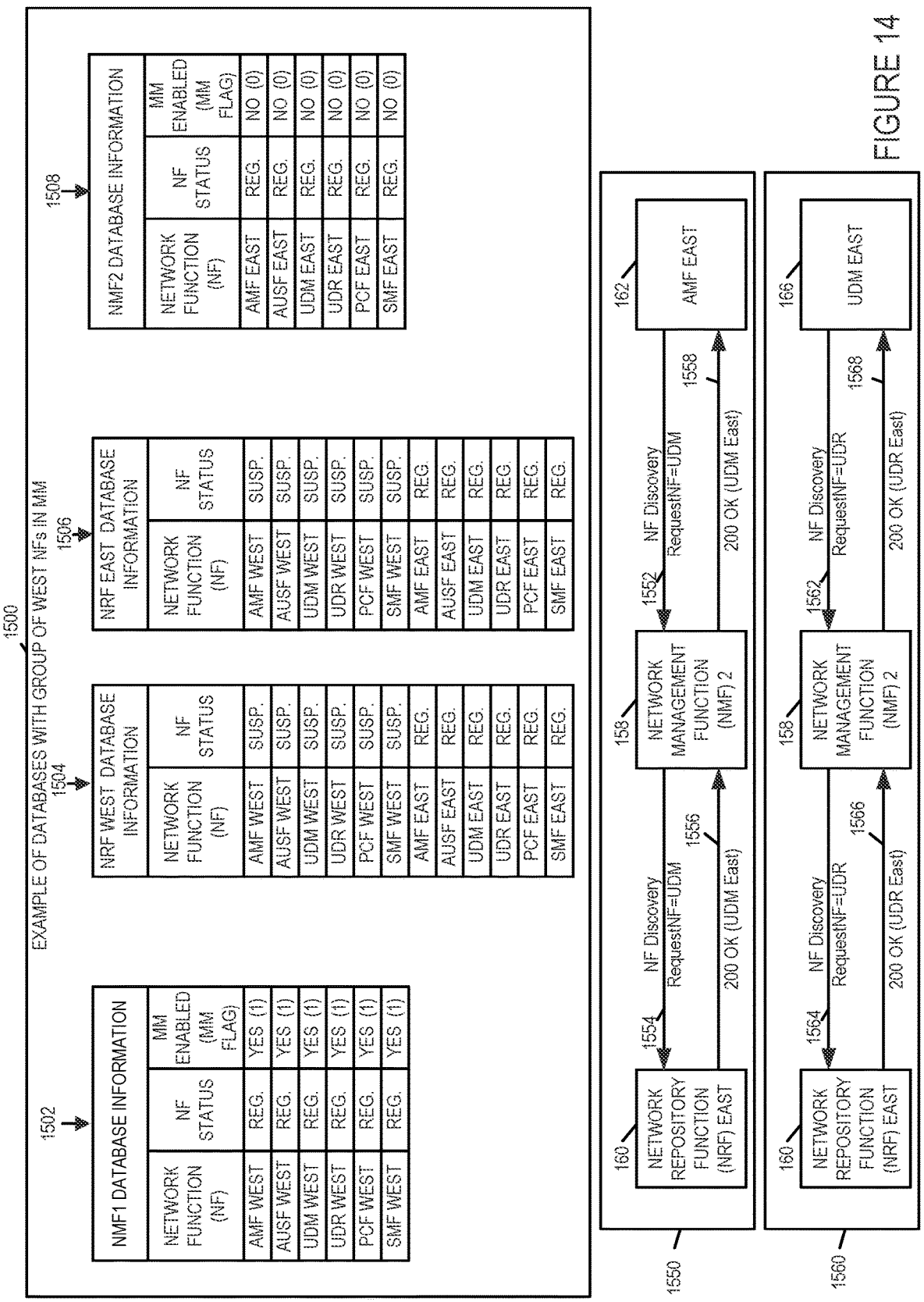
FIG. 14 illustrates exemplary databases and exemplary discovery request and response message signaling for an example in which a geographic region of NFs are in maintenance mode.

FIG. 14 illustrates exemplary databases and exemplary discovery request and response message signaling for an example in which a geographic region of NFs are in maintenance mode. Box 1500 illustrates exemplary databases for an example in which a group of west NFs are in maintenance mode. Network Management Function 1 (NMF1) database information 1502 includes information included in NMF1 database 204 of NMF1 138. Network Management Function 2 (NMF2) database information 1308 includes information included in NMF2 database 208 of NMF2 158. NRF west database information 1304 includes information included in NRF west database 202 of NRF west 140. NRF east database information 1306 includes information included in NRF database 206 of NRF east 160.

Network Management Function 1 (NMF1) database information 1502 indicates that for each of the Network Function (NFs) (AMF west 142, AUSF west 144, UDM west 146, UDR west 148, PCF west 150, SMF west 152), NF status=registered (REG.), maintenance mode is enabled, and the maintenance mode flag bit is set to 1. Network Management Function 2 (NMF2) database information 1508 indicates that for each of the Network Function (NFs) (AMF east 162, AUSF east 164, UDM east 166, UDR 168, PCF east 170, SMF east 172), NF status=registered (REG.), maintenance mode is not enabled, and the maintenance mode flag bit is set to 0 (indicating MM not enabled). NFR west database information 1504 indicates that for each of the Network Function (NFs) (AMF west 142, AUSF west 144, UDM west 146, UDR west 148, PCF west 150, SMF west 152), NF status=suspended (SUSP.). NFR west database information 1504 indicates that for each of the Network Function (NFs) (AMF east 162, AUSF east 164, UDM east 166, UDR east 168, PCF east 170, SMF east 172), NF status=registered (REG.). NFR east database information 1506 indicates that for each of the Network Function (NFs) (AMF west 142, AUSF west 144, UDM west 146, UDR west 148, PCF west 150, SMF west 152), NF status=suspended (SUSP.). NFR east database information 1506 further indicates that for each of the Network Function (NFs) (AMF east 162, AUSF east 164, UDM east 166, UDR east 168, PCF east 170, SMF east 172), NF status=registered (REG.).

FIG. 14 further includes block 1550 which illustrates an exemplary new discovery request when the west region of NFs are in maintenance mode (MM enabled). AMF east 162 generates and sends a NF Discovery RequestNF=UDM message 1552 to NMF 2 158, which receives message 1552, and proxies the NF Discovery RequestNF=UDM message, as message 1554 to the NRF east 160. The NRF 160 receives message 1554, checks its database, determines that UDM east is listed in its database with NF status=Registered and can support the services requested (note UDM west is listed in its database with NF status=Suspended and is therefore removed from consideration), generates 200 OK (UDM east) response message 1556 and sends response message 1556 to NMF 2 158. NMF 2 158 receives the 200 OK (UDM east) response message 1556 and proxies the message as 200 OK (UDM east) response message 1558 to AMF east 162 which receives message 1558 and recovers the communicated information. AMF east 162 can use UDM east 166 to provide service.

FIG. 14 further includes block 1560 which illustrates an exemplary new discovery request when the west region of NFs are in maintenance mode (MM enabled). UDM east 162 generates and sends a NF Discovery RequestNF=UDR message 1562 to NMF 2 158, which receives message 1562, and proxies the NF Discovery RequestNF=UDR message, as message 1564 to the NRF east 160. The NRF 160 receives message 1564, checks its database, determines that UDR east is listed in its database with NF status=Registered and can support the services requested (note UDR west is listed in its database with NF status=Suspended and is therefore removed from consideration), generates 200 OK (UDR east) response message 1566 and sends response message 1566 to NMF 2 158. NMF 2 158 receives the 200 OK (UDR east) response message 1566 and proxies the message as 200 OK (UDR east) response message 1568 to UDM east 166 which receives message 1568 and recovers the communicated information. UDM east 166 can use UDR east 168 to provide service.

Various aspects and/or features of some embodiments of the present invention are further described below. Various embodiments of the present invention are directed to methods and apparatus for providing centralized management of Network Functions (NFs) in a network. A new Network Function (NF), referred to as Network Management Function (NMF) or Network function Management Function (NMF) in accordance with the present invention, is introduced and included in the core network, e.g., a 5G core network. The novel NMF includes a Network Management Function database (NMFDB) including maintenance mode (MM) flag(s) and control logic for processing received messages from NFs, said control logic using the maintenance mode flag value information in determining which processing operations to perform. The NMF is placed between NFs, which are to be managed by the NMF, and a Network (function) Repository Function (NRF), which includes a typical NRF database which does not include any MM flags.

The NMF database (NMFDB) includes entries corresponding to each NF currently being managed by the NMF, each entry corresponding to a NF in the NMFDB includes a maintenance mode configuration flag (e.g., a 1 bit flag indicating whether the maintenance mode is enabled or not enabled (normal operation) for the NF to which the entry corresponds. The new configuration flag "maintenance mode" is used to take a NF or a group of NFs ('site') out of service, with no configuration changes on the NFs. The NRF is one of the main network elements in a 5G network which has information about all the NFs in the network along with site information and the services that the NFs provide that is shared when the NFs register. In accordance with a feature of the present invention, by adding and using the MM flags on the NMF, which is coupled to the NRF, it is possible to manage the traffic flow in the network. For example, when there is a network issue, and the traffic needs to be directed to a different site, the new configuration parameter (maintenance mode flag) can be enabled in the NMFDB for each of the NFs at that site. The NF status' in the NMFDB is not changed, e.g., if the NF status for a NF in the NMFDB was "REGISTERED", the NF status for the NF in the NMFDB remains "REGISTERED". However, the NMF, in response to the MM flags being enabled for each of the NFs at the site, will send messages to the NRF to change the NF state (status) in the NRF database for each of the NFs at the site to "SUSPENDED". Then the NRF, in response to NF state (status) changes, notifies the subscribed NFs that the NFs at that site are SUSPENDED, so that no new traffic is sent to the NFs at that site. Thus, in accordance with the present invention, it is possible to put a complete site (e.g., a west site or an east site) on Maintenance Mode Enabled without changing any configuration on NFs or manually deregistering the NFs from an NRF.

When there is a discovery request for a particular type of NF sent to the NRF, the NFs, which are in maintenance mode in the NMFDB, are not provided (e.g., removed from consideration and not included) by the NRF in the discovery response list of NFs which are available to provide the requested service, since those NFs (which are in MM enabled in the NMFDB) are listed in the NRF database as NF status=SUSPENDED. Thus, all new traffic will be directed to the remote site NFs, which include NFs with NF status=REGISTERED in the NRF database. The same configuration flag(s) can be, and sometimes are, used to manage one or a few NFs during an upgrade/maintenance activity as well. There are typically multiple instances of the same type of NF in a geographic area or in an overall network, and it can to advantageous to direct traffic away from that one particular identified NF to other alternative NFs of the same type, using the method of the present invention, so that the one particular NF can be upgraded or so that maintenance activities can be performed on that one particular NF.

As all of the NFs are discovered using the NRF, which is coupled to the NMF, this implementation of using a NMF including a NMFDB with MM flags, provides a centralized way of managing the network with very minimal intervention for any network issues or maintenance.

An exemplary Network Management Function (NMF), in accordance with various embodiments of the present invention, will now be described. NMF—Network Management Function is used to manage/control the state of a NF (Network Function as defined in 3gpp TS23.501) or NFs. In some embodiments, the NMF is implemented as new NF. In some embodiments, the NMF is implemented as an extension to the existing NRF (Network Repository Function as defined in 3gpp TS23.501) functionality. NFs (e.g., each of the NFs in a network or in group of NFs such as a group based on geographic region) will send the traffic to the NMF and the NMF forwards the traffic towards the NRF based on the decision logic described in the below sections.

NMF operations with regard to Register Request from NFs will now be described.

When receiving a register request from a given NF, the NMF will check if the NF is already registered in the internal database and whether the maintenance mode is enabled or not for such NF:

If NF is in the Internal Database:

Maintenance Mode=Y— If the NF is in maintenance mode, the NMF updates its local database and does not forward the register request to NRF and sends a success response to the NF from which it received the request.

Maintenance Mode=N— If the NF is not in maintenance mode, the NMF updates its local database and forwards the register request to NRF for processing and forwards the response back to the NF. If the response from NRF is not a success, the entry is removed from the database. NMF also subscribes to NRF for any change to registered NF state.

If NF is not in the Internal Database:

The NMF shall create an entry in the database and forward the request to NRF for processing and forward the response back to NF through the NMF. The NMF will also subscribe to NRF for any change in status of the registered NF. If the response from NRF is not a success, the entry is removed from the database.

NMF operations with regard to Patch Request from NFs to update the state will now be described. On receiving the Patch Request from the NF, the NMF checks if the NF is in the internal database and if the maintenance mode is enabled for the NF:

Maintenance Mode=Y— If the NF is in maintenance mode, the NMF updates its local database and does not forward the Patch request to NRF and sends a success response to the NF from which it received the request.

Maintenance Mode=N— If the NF is not in maintenance mode, the NMF updates its local database and forwards the Patch Request to NRF for processing and forwards the response back to the NF.

Heartbeat Message from NFs will now be described. Periodically every NF registered in NRF, sends heartbeat message for keep-alive and when it is not received, the NRF marks that NF as suspended. This is a PATCH request; the behavior is covered in the previous section.

Heartbeat Failure Notification related operations will now be described. The NMF subscribes to NRF for NF status change for suspension due to heartbeat failure. When the NF state changes, the NRF notifies NMF. This is required to keep the database in sync with the NRF. When the NMF receives the notification, it checks the maintenance mode:

Maintenance Mode=Y— Drop the notification request, no processing required.

Maintenance Mode=N— If the NF is not in maintenance mode, the NMF updates its local database if the stored NF state is different from what it received.

Transparent Proxy function operation by the NMF for Discovery Requests and subscribe messages will now be described. Messages like NF discovery and subscribe messages are transparently proxied towards the NRF and the response is relayed back to the NF that requested it. This feature is required to maintain existing NF/NRF functionality. There is no database update for this request.

Enable/Disable Maintenance Mode for NF functionality will now be described.

With this functionality, in accordance with the present invention, it is possible to enable Maintenance Mode for a NF or multiple NFs or a complete Site.

Maintenance Mode=Y— When the Maintenance Mode is set to Yes for a NF, the NMF updates the flag in its internal database and sends a PATCH request to SUSPEND the NF in the NRF. The NRF notifies the subscribed NFs that the NF is suspended. The Notification request will be directly from the NRF to the subscribed NFs.

Maintenance Mode=N— When the Maintenance Mode is set to No, the NMF updates the internal database, and sends a PATCH (suspended or registered)/DELETE (deregistered) request to NRF to update the state in the local database for that NF towards the NRF. The NRF updates the NF state and sends notification towards the subscribed NFs. The Notification request will be directly from the NRF to the NF.

NMF operations with regard to Deregister Request will now be described.

The Deregister request deletes the NF profile from the NRF. When the NMF receives the deregister request from the NF:

Maintenance Mode=Y— Update the NF state to deregister in the internal database and do not forward the request to NRF.

Maintenance Mode=N— When the Maintenance Mode is set to No, the NMF forwards the request to NRF. On a success response, the entry is deleted from the database. Deletion is done on successful response to keep the database in sync with the NRF Numbered List of Exemplary Method Embodiments Method Embodiment 1. A method of supporting network functions, the method comprising: operating a network management function (NMF) to receive (310) a first network function register request message from a first network function (NF); checking (322) a network management function database (NMFDB) (204), to determine if the first NF is listed in the NMFDB, said NMFDB including maintenance mode flags for individual network functions listed in the NMFDB; and creating (326), when said check determines that said NMFDB does not include an entry for the first NF an entry in said NMDB for the first NF in said NFNDB; and checking (324), when said check determines that said NMFDB does include an entry for the first NF, the maintenance mode indicator for the first NF in the NMFDB to determine if maintenance mode is enabled for the first NF or disabled for the first NF.

Method Embodiment 1A. The method of Method Embodiment 1, wherein said checking (322) to determine if the first NF is listed in the NMFDB determines that said first NF is not listed in the NMFDB; and wherein the method includes creating (326) an entry in said NMFDB for the first NF, said created entry including a maintenance mode indicator indicating that said first NF is not in maintenance mode (e.g., MM flag for first NF in created entry corresponding to first NF is set to 0 indicating normal function with regard to the first NF (e.g., the NMF acts as a proxy passing messages between the first NF and the NRF, and the NRF may, and sometimes does list the first NF in a discovery response)).

Method Embodiment 1B. The method of Method Embodiment 1A, further comprising: operating the NMF to forward (348) the received first network function register request message to a first network repository function (NRF) (e.g., NRF WEST); and operating the NMF to subscribe (356) to the first NRF for status changes (e.g., so that the NMF is notified for status changes detected by the first NRF corresponding to the first NF).

Method Embodiment 1C. The method of Method Embodiment 1B further comprising: operating the NMF to receive (first iteration through step 316) a first NF discovery request; operating the NMF to proxy (392) (e.g., forward on behalf of the original sender) the first NF discovery request to the first NRF; and operating the NMF to receive a response (394) to the proxied first NF discovery request, said response including the first NF and another NF providing the same service as the first NF (e.g., because both the first NF and the another NF are listed in the NRF database and are available for providing services corresponding to the first discovery request to devices) (e.g., both the first NF and the another NF are listed in the NRF database with NF status=registered and NF service status=registered and both are listed as being able to meet the requested service requirements in the received discovery request).

Method Embodiment 1D. The method of Method Embodiment 1C, further comprising: operating NMF to receive (309) a command to modify (e.g., change the current state of the flag) the maintenance mode of the first NF (in some embodiments said command instructs the maintenance mode indicator to be changed to put the first NF in a specified state, e.g., indicates maintenance mode is to be enabled or maintenance mode is to be set to not enabled, but in other cases it simply indicates the binary state of the maintenance mode indicator should be flipped from what is stored in the NMFDB for the first NF to which the message relates).

Method Embodiment 1E. The method of Method Embodiment 1D, further comprising: determining (428) if the command to modify the maintenance mode of the first NF requires a change from a maintenance mode enabled state to a maintenance mode non-enabled (normal) NF state (this in some cases is implemented by checking if the maintenance mode of the first NF is set so that it is enabled, e.g., the first NF is off line and is to be switched to normal mode operation—NO output of decision step).

Method Embodiment 1F The method of Method Embodiment 1E further comprising: in response to determining that the command to modify the maintenance mode of the first NF requires a change from a maintenance mode enabled state to a maintenance mode non-enabled (normal) state of operation, sending (440) a patch request to the first NRF to update status information in the NRF corresponding to the first NF so that the state in the NRF will match the status information for the first NF in the NMFDB.

Method Embodiment 1FA. The method of Method Embodiment 1F, wherein the status information for the first NF in the first NMFDB and the NRF are different for at least a portion of the time while the maintenance mode is enabled in the NMF for the first NF (e.g., the NF may be listed as registered and/or available in the NMFDB while in the NRF database the first NF is indicated to be in a suspended state so that the NRF will not provide information about the first NF in response to NF discovery requests since it is indicated to be in a suspended status in the NRF database).

Method Embodiment 1G. The method of Method Embodiment 1E, further comprising: in response to determining that the command to modify the maintenance mode of the first NF requires a change from a maintenance mode non-enabled (normal) state of operation to a maintenance mode enabled state of operation, operating the NMF to i) update (430) the maintenance mode indicator in the NFMDB corresponding to the first NF from indicating a non-enabled state (e.g., 0 indicating normal operation) to indicating a maintenance mode enabled state (e.g., set maintenance mode indicator for the first NF to 1); and ii) send (432) a patch request to the first NRF to update status information in the NRF corresponding to the first NF so that the status information for the first NF in the NRF (database) indicates a suspended status for the first NF.

Method Embodiment 1H. The method of Method Embodiment 1G, further comprising: operating the NMF to receive a second discovery request (relating to the first NF), said second discovery request (relating to the first NF) being received while the first NF is indicated in said NFMDB to be in a maintenance mode enabled state of operation (e.g., a second iteration of step 316 but while the first NF is in a maintenance mode (MM enabled), with the status of the first NF having been set to "SUSPENDED" in the NRF database, and the status for the first NF in the NMFDB indicating "REGISTERED" and the maintenance mode being enabled for the first NF).

Method Embodiment 1J. The method of Method Embodiment 1H, further comprising: operating (second iteration of step 392) the NMF to proxy (e.g., forward on behalf of the source of the second NF discovery request) the second NF discovery request (corresponding to the first NF) to the NRF; and operating (second iteration of step 394) the NMF to receive a response to the second NF discovery request (corresponding to the first NF) identifying the additional NF which provides the same function as the first NF (e.g., indicating it is available to provide the function) without identifying the first NF which has been placed in maintenance mode.

Method Embodiment 1J1. The method of Method Embodiment J, wherein said first NF (e.g., UDR west 148) is a NF of a first type (e.g., UDR type); wherein said additional NF (e.g., UDR east 168) is a NF of the first type; and wherein said first discovery request and said second discovery request are requesting identification information for one or more network functions of the first type (e.g., UDR type) which are available to provide requested services (identified in the discovery request).

Method Embodiment 1K. The method of Method Embodiment 1J, further comprising: operating the NMF to provide (second iteration of step 396) the response to the second NF discovery request to the function which sent the second NF discovery request (e.g., UDM west 146 for the example where the first NF is UDR west 148).

Method Embodiment 1L. The method of Method Embodiment 1, further comprising: receiving (309 or 311) at the NMF a control message switching one or more NFs from a normal state to a maintenance mode state of operation; and setting (e.g., changing) (one or more iterations of step 430) the maintenance mode state indicators for said one or more NFs in said NMFDB to indicate that said one or more NFs are in maintenance mode.

Method Embodiment 1M. The method of Method Embodiment 1L, further comprising: suspending (330), at the NMF forwarding of registration request messages to a network registration function (NRF) for NF registration functions while the NF registration functions are in a maintenance mode enabled state.

Method Embodiment 1N. The method of Method Embodiment 1, wherein said checking (322) the NMFDB determines that the first network function is not listed in the NMFDB (e.g., N output determined), and wherein the method further comprises: operating the NMF to forward (348) the first register request message to a first (e.g., West) network repository function (NRF) for processing.

Method Embodiment 1P. The method of Method Embodiment 1N, further comprising: operating the NMF to receive (350) a response to the forwarded first network function register request message from the NRF; and operating the NMF to forward (354 or 360) the response to the forwarded first network function register request message to the first NF.

Method Embodiment 1Q. The method of Method Embodiment 1P, further comprising: checking (353) the response to the forwarded first NF registration request from the NRF to determine if the response indicates success; in response to said checking of the response to the forwarded first NF registration request indicating success (e.g., Y output of step 352) operating the NFM to subscribe (356) to the NRF for status change updates corresponding to the first NF; and in response to said checking of the response to the forwarded first NF registration request indicating a failure (e.g., N output of step 352) removing (e.g., deleting) (358) the entry for the first NF from the NMFDB.

Method Embodiment 2. The method of Method Embodiment 1, wherein said check (322) at the NMFDB determines that (Y output of step 322) said NMFDB includes an entry for the first NF; and wherein said check (324) of the maintenance mode indicator corresponding to the first NF in the NMFDB indicates maintenance mode is not enabled (N output of step 324) for the first NF (e.g., first NF is functioning normally and available for use); and wherein the method further comprises: operating the NMF to forward (336) the first register request message to a first (e.g., West) network repository function (NRF) for processing.

Method Embodiment 3. The method of Method Embodiment 2, further comprising: operating the NMF to receive (338) a response to the forwarded first network function register request message from the NRF; and operating the NMF to forward (340) the response to the forwarded first network function register message to the first NF.

Method Embodiment 4. The method of Method Embodiment 3, further comprising: checking (342), at the NMF, the response to the forwarded first network function register message to determine if the first registration request was successful.

Method Embodiment 5. The method of Method Embodiment 4, further comprising: operating the NMF to subscribe (346) to the NRF for status changes corresponding to the first NF in response to determining that the first registration request was successful; and operating the NMF to remove (344) the entry corresponding to the first NF from the NMFDB in response to determining that the first registration request was not successful.

Method Embodiment 6. The method of Method Embodiment 1, wherein said check (322) at the NMFDB determines that said NMFDB includes an entry for the first NF; and wherein said check (324) of the maintenance mode indicator corresponding to the first NF in the NMFDB indicates maintenance mode is enabled (e.g., Y output of 324 is used) for the first NF (e.g., first NF is offline for maintenance and is not available for use); and wherein the method further comprises: operating the NMF to update (328) the status of the entry in the NMFDB corresponding to the first NF based on the first NF registration request message (e.g., refresh or revise the stored information in the entry corresponding to the first NWF to include information included in the received first NF request or to update the information on the time of the most recent registration of the first NF); operating the NMF to refrain from forwarding (330) the first register request message to a first (e.g., West) network repository function (NRF) for processing; and operating the NMF to send (322) a success response to the first NF from which the first NF registration request was received.

Method Embodiment 7. The method of Method Embodiment 2, wherein following the updating of the NMFDB entry for the first NF while the first NF is in maintenance mode, the information in an entry corresponding to the first NF in a NRF database will differ from an entry corresponding to the first NF in the NMFDB (e.g., the first NF status="SUSPENDED" in the NRF database while the first NF status="REGISTERED" in the NMFDB).

Method Embodiment 8. The method of Method Embodiment 7, further comprising: in response to a change (e.g., as triggered by and or indicated in a control message from a control device that is received by the NMF) of the first NF maintenance mode flag switching from a maintenance enabled state to maintenance mode not enabled state (e.g., a normal state of operation) in the NMFDB, communicating (440) information stored in the entry corresponding to the first NF in the NMFDB to the NRF to thereby update the state information (including NF status) stored in a NRF database to match the information stored in the entry for the first NF in the NMFDB.

Numbered List of Exemplary Apparatus Embodiments

Apparatus Embodiment 1. A network management function (NMF) (NMF1 138 or NMF2 148 or NMF 500) device comprising: a receiver (506); a transmitter (508); memory (510) including a network management function database (NMFB) (204 or 208 or 564); and a processor (502) configured to: operate the network management function (NMF) to receive (310) a first network function register request message from a first network function (NF); check (322) the network management function database (NMFDB) (204), to determine if the first NF is listed in the NMFDB, said NMFDB including maintenance mode flags for individual network functions listed in the NMFDB; and create (326), when said check determines that said NMFDB does not include an entry for the first NF an entry in said NMDB for the first NF in said NFNDB; and check (324), when said check determines that said NMFDB does include an entry for the first NF, the maintenance mode indicator for the first NF in the NMFDB to determine if maintenance mode is enabled for the first NF or disabled for the first NF.

Apparatus Embodiment 1A. The network management function (NMF) device of Apparatus Embodiment 1, wherein said checking (322) to determine if the first NF is listed in the NMFDB determines that said first NF is not listed in the NMFDB; and wherein said processor (502) is configured to create (326) an entry in said NMFDB for the first NF, said created entry including a maintenance mode indicator indicating that said first NF is not in maintenance mode (e.g., MM flag for first NF in created entry corresponding to first NF is set to 0 indicating normal function with regard to the first NF (e.g., the NMF acts as a proxy passing messages between the first NF and the NRF, and the NRF may, and sometimes does list the first NF in a discovery response)).

Apparatus Embodiment 1B. The network management function (NMF) device of Apparatus Embodiment 1A, wherein said processor (502) is configured to: operate the NMF to forward (348) the received first network function register request message to a first network repository function (NRF) (e.g., NRF WEST); and operate the NMF to subscribe (356) to the first NRF for status changes (e.g., so that the NMF is notified for status changes detected by the first NRF corresponding to the first NF).

Apparatus Embodiment 1C. The network management function (NMF) device of Apparatus Embodiment 1B, wherein said processor (502) is further configured to: operate the NMF to receive (first iteration through step 316) a first NF discovery request; operate the NMF to proxy (392) (e.g., forward on behalf of the original sender) the first NF discovery request to the first NRF; and operate the NMF to receive a response (394) to the proxied first NF discovery request, said response including the first NF and another NF providing the same service as the first NF (e.g., because both the first NF and the another NF are listed in the NRF database and are available for providing services corresponding to the first discovery request to devices) (e.g., both the first NF and the another NF are listed in the NRF database with NF status=registered and NF service status=registered and both are listed as being able to meet the requested service requirements in the received discovery request).

Apparatus Embodiment 1D. The network management function (NMF) device of Apparatus Embodiment 1C, wherein said processor (502) is further configured to: operate NMF to receive (309) a command to modify (e.g., change the current state of the flag) the maintenance mode of the first NF (in some embodiments said command instructs the maintenance mode indicator to be changed to put the first NF in a specified state, e.g., indicates maintenance mode is to be enabled or maintenance mode is to be set to not enabled, but in other cases it simply indicates the binary state of the maintenance mode indicator should be flipped from what is stored in the NMFDB for the first NF to which the message relates).

Apparatus Embodiment 1E. The network management function (NMF) device of Apparatus Embodiment 1D, wherein said processor is further configured to: determine (428) if the command to modify the maintenance mode of the first NF requires a change from a maintenance mode enabled state to a maintenance mode non-enabled (normal) NF state (this in some cases is implemented by checking if the maintenance mode of the first NF is set so that it is enabled, e.g., the first NF is off line and is to be switched to normal mode operation—NO output of decision step).

Apparatus Embodiment 1F The network management function (NMF) device of Apparatus Embodiment 1E, wherein said processor is configured to: operate the network management function (NMF) device to send (440), in response to determining that the command to modify the maintenance mode of the first NF requires a change from a maintenance mode enabled state to a maintenance mode non-enabled (normal) state of operation, a patch request to the first NRF to update status information in the NRF corresponding to the first NF so that the state in the NRF will match the status information for the first NF in the NMFDB.

Apparatus Embodiment 1FA. The network management function (NMF) device of Apparatus Embodiment 1F, wherein the status information for the first NF in the first NMFDB and the NRF are different for at least a portion of the time while the maintenance mode is enabled in the NMF for the first NF (e.g., the NF may be listed as registered and/or available in the NMFDB while in the NRF database the first NF is indicated to be in a suspended state so that the NRF will not provide information about the first NF in response to NF discovery requests since it is indicated to be in a suspended status in the NRF database).

Apparatus Embodiment 1G. The network management function (NMF) device of Apparatus Embodiment 1E, wherein said processor is further configured to perform the following operations in response to determining that the command to modify the maintenance mode of the first NF requires a change from a maintenance mode non-enabled (normal) state of operation to a maintenance mode enabled state of operation: operate the NMF to i) update (430) the maintenance mode indicator in the NFMDB corresponding to the first NF from indicating a non-enabled state (e.g., 0 indicating normal operation) to indicating a maintenance mode enabled state (e.g., set maintenance mode indicator for the first NF to 1); and ii) send (432) a patch request to the first NRF to update status information in the NRF corresponding to the first NF so that the status information for the first NF in the NRF (database) indicates a suspended status for the first NF.

Apparatus Embodiment 1H. The network management function (NMF) device of Apparatus Embodiment 1G, wherein said processor is further configured to: operate the NMF to receive a second discovery request (relating to the first NF), said second discovery request (relating to the first NF) being received while the first NF is indicated in said NFMDB to be in a maintenance mode enabled state of operation (e.g., a second iteration of step 316 but while the first NF is in a maintenance mode (MM enabled), with the status of the first NF having been set to "SUSPENDED" in the NRF database, and the status for the first NF in the NMFDB indicating "REGISTERED" and the maintenance mode being enabled for the first NF).

Apparatus Embodiment 1J. The network management function (NMF) device of Apparatus Embodiment 1H, wherein said processor is further configured to: operate (second iteration of step 392) the NMF to proxy (e.g., forward on behalf of the source of the second NF discovery request) the second NF discovery request (corresponding to the first NF) to the NRF; and operate (second iteration of step 394) the NMF to receive a response to the second NF discovery request (corresponding to the first NF) identifying the additional NF which provides the same function as the first NF (e.g., indicating it is available to provide the function) without identifying the first NF which has been placed in maintenance mode.

Apparatus Embodiment 1J1. The network management function (NMF) device of Apparatus Embodiment J, wherein said first NF (e.g., UDR west 148) is a NF of a first type (e.g., UDR type); wherein said additional NF (e.g., UDR east 168) is a NF of the first type; and wherein said first discovery request and said second discovery request are requesting identification information for one or more network functions of the first type (e.g., UDR type) which are available to provide requested services (identified in the discovery request).

Apparatus Embodiment 1K. The network management function (NMF) device of Apparatus Embodiment 1J, wherein said processor is further configured to: operating the NMF to provide (second iteration of step 396) the response to the second NF discovery request to the function which sent the second NF discovery request (e.g., UDM west 146 for the example where the first NF is UDR west 148).

Apparatus Embodiment 1L. The network management function (NMF) device of Apparatus Embodiment 1, wherein said processor is further configured to: operate the NMF device to receive (309 or 311) at the NMF a control message switching one or more NFs from a normal state to a maintenance mode state of operation; and setting (e.g., changing) (one or more iterations of step 430) the maintenance mode state indicators for said one or more NFs in said NMFDB to indicate that said one or more NFs are in maintenance mode.

Apparatus Embodiment 1M. The network management function (NMF) device of Apparatus Embodiment 1L, wherein said processor is further configured to: suspend (330), at the NMF forwarding of registration request messages to a network registration function (NRF) for NF registration functions while the NF registration functions are in a maintenance mode enabled state.

Apparatus Embodiment 1N. The network management function (NMF) device of Apparatus Embodiment 1, wherein said checking (322) the NMFDB determines that the first network function is not listed in the NMFDB (e.g., N output determined), and wherein the processor is further configured to: operate the NMF to forward (348) the first register request message to a first (e.g., West) network repository function (NRF) for processing.

Apparatus Embodiment 1P. The network management function (NMF) device of Apparatus Embodiment 1N, wherein said processor is further configured to: operate the NMF to receive (350) a response to the forwarded first network function register request message from the NRF; and operate the NMF to forward (354 or 360) the response to the forwarded first network function register request message to the first NF.

Apparatus Embodiment 1Q. The network management function (NMF) device of Apparatus Embodiment 1P, wherein said processor is further configured to: check (353) the response to the forwarded first NF registration request from the NRF to determine if the response indicates success; in response to said checking of the response to the forwarded first NF registration request indicating success (e.g., Y output of step 352), operate the NFM to subscribe (356) to the NRF for status change updates corresponding to the first NF; and in response to said checking of the response to the forwarded first NF registration request indicating a failure (e.g., N output of step 352), remove (e.g., delete) (358) the entry for the first NF from the NMFDB.

Apparatus Embodiment 2. The network management function (NMF) device of Apparatus Embodiment 1, wherein said check (322) at the NMFDB determines that (Y output of step 322) said NMFDB includes an entry for the first NF; and wherein said check (324) of the maintenance mode indicator corresponding to the first NF in the NMFDB indicates maintenance mode is not enabled (N output of step 324) for the first NF (e.g., first NF is functioning normally and available for use); and wherein the processor is further configured to: operate the NMF to forward (336) the first register request message to a first (e.g., West) network repository function (NRF) for processing.

Apparatus Embodiment 3. The network management function (NMF) device of Apparatus Embodiment 2, wherein said processor is further configured to: operate the NMF to receive (338) a response to the forwarded first network function register message from the NRF; and operate the NMF to forward (340) the response to the forwarded first network function register message to the first NF.

Apparatus Embodiment 4. The network management function (NMF) device of Apparatus Embodiment 3, wherein said processor is further configured to: check (342), at the NMF, the response to the forwarded first network function register message to determine if the first registration request was successful.

Apparatus Embodiment 5. The network management function (NMF) device of Apparatus Embodiment 4, wherein said processor is further configured to: operate the NMF to subscribe (346) to the NRF for status changes corresponding to the first NF in response to determining that the first registration request was successful; and operating the NMF to remove (344) the entry corresponding to the first NF from the NMFDB in response to determining that the first registration request was not successful.

Apparatus Embodiment 6. The network management function (NMF) device of Apparatus Embodiment 1, wherein said check (322) at the NMFDB determines that said NMFDB includes an entry for the first NF; and wherein said check (324) of the maintenance mode indicator corresponding to the first NF in the NMFDB indicates maintenance mode is enabled (e.g., Y output of 324 is used) for the first NF (e.g., first NF is offline for maintenance and is not available for use); and wherein the processor is further configured to: operate the NMF to update (328) the status of the entry in the NMFDB corresponding to the first NF based on the first NF registration request message (e.g., refresh or revise the stored information in the entry corresponding to the first NWF to include information included in the received first NF request or to update the information on the time of the most recent registration of the first NF); operate the NMF to refrain from forwarding (330) the first register request message to a first (e.g., West) network repository function (NRF) for processing; and operate the NMF to send (322) a success response to the first NF from which the first NF registration request was received.

Apparatus Embodiment 7. The network management function (NMF) device of Apparatus Embodiment 2, wherein following the updating of the NMFDB entry for the first NF while the first NF is in maintenance mode, the information in an entry corresponding to the first NF in a NRF database will differ from an entry corresponding to the first NF in the NMFDB (e.g., the first NF status="SUSPENDED" in the NRF database while the first NF status="REGISTERED" in the NMFDB).

Apparatus Embodiment 8. The network management function (NMF) device of Apparatus Embodiment 7, wherein said processor is further configured to: operate the NMF device to communicate (440) information stored in the entry corresponding to the first NF in the NMFDB to the NRF to thereby update the state information (including NF status) stored in a NRF database to match the information stored in the entry for the first NF in the NMFDB, in response to a change (e.g., as triggered by and or indicated in a control message from a control device that is received by the NMF) of the first NF maintenance mode flag switching from a maintenance enabled state to maintenance mode not enabled state (e.g., a normal state of operation) in the NMFDB, Apparatus Embodiment 9. The network management function (NMF) device of Apparatus Embodiment 1, wherein said network management function (NMF) device provides network management for a set of NFs corresponding to a geographic region (e.g., east region or west region).

Apparatus Embodiment 9A. The network management function (NMF) device of Apparatus Embodiment 1, wherein the NMF device is an intermediary between said set of NFs corresponding to the geographic region and a NRF device corresponding to the geographic region.

Apparatus Embodiment 10. The network management function (NMF) device of Apparatus Embodiment 1, wherein said network management function (NMF) device provides network management for the NFs corresponding to multiple geographic regions (e.g., one NMF device is used to manage NFs in both an east region and NFs in a west region).

Apparatus Embodiment 11. The network management function (NMF) device of Apparatus Embodiment 1, wherein said NMF device is a separate device from a network repository function (NRF) device which is coupled to said NMF device.

Apparatus Embodiment 12. The network management function (NMF) device of Apparatus Embodiment 1, wherein said NMF device is included in an enhanced network repository function (NRF) device (sometimes referred to as an enhanced Network function Network Repository Function (NRF) device), said enhanced NRF device including: a NRF database which does not include maintenance mode flags, said NRF database being in addition to said NMF database (NMFDB) which includes a maintenance mode flag for each NF entry in the NMFDB.

Apparatus Embodiment 13. The network management function (NMF) device of Apparatus Embodiment 13, wherein NF status corresponding to an NF instance in the NMFDB and the same NF instance in NRF database is different during at least some of the time during which the maintenance mode flag for the NF instance in the NMFDB is set to indicate maintenance mode enabled (e.g., NF status=Suspended in the NRF database; NF status=Registered in the NMFDB.)

List of Exemplary Non-Transitory
Computer Readable Medium Embodiments

Non-Transitory Computer Readable Medium Embodiment 1. A non-transitory computer readable medium (510) including machine executable instructions, which when executed by a processor (502) of a network management function (NMF) device (138, 158, or 500), cause the NMF device to: operate the network management function (NMF) to receive (310) a first network function register request message from a first network function (NF); check (322) a network management function database (NMFDB) (204), to determine if the first NF is listed in the NMFDB, said NMFDB including maintenance mode flags for individual network functions listed in the NMFDB; and create (326), when said check determines that said NMFDB does not include an entry for the first NF an entry in said NMDB for the first NF in said NFNDB; and check (324), when said check determines that said NMFDB does include an entry for the first NF, the maintenance mode indicator for the first NF in the NMFDB to determine if maintenance mode is enabled for the first NF or disabled for the first NF.

The techniques of various embodiments may be implemented using software, hardware and/or a combination of software and hardware. Various embodiments are directed to apparatus, e.g., core network nodes, e.g., a core network node including a Network Management Function (NMF), a core network node including a Network (function) Repository Function (NRF), a network node including a AMF, AUSF, UDM, UDR, PCF or SMF, user equipment devices, wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements. Various embodiments are also directed to methods, e.g., method of controlling and/or operating e.g., core network nodes, e.g., a core network node including a Network Management Function (NMF), a core network node including a Network (function) Repository Function (NRF), a network node including a AMF, AUSF, UDM, UDR, PCF or SMF, user equipment devices, wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of each of the described methods.

In various embodiments each of the steps or elements of a method are implemented using one or more processors. In some embodiments, each of elements or steps are implemented using hardware circuitry.

In various embodiments devices, e.g., core network nodes, e.g., a core network node including a Network Management Function (NMF), a core network node including a Network (function) Repository Function (NRF), a network node including a AMF, AUSF, UDM, UDR, PCF or SMF, user equipment devices, wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements described herein are implemented using one or more components to perform the steps corresponding to one or more methods, for example, provisioning user equipment devices, provisioning AP devices, provisioning AAA servers, provisioning orchestration servers, generating messages, message reception, message transmission, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., core network nodes, e.g., a core network node including a Network Management Function (NMF), a core network node including a Network (function) Repository Function (NRF), a network node including a AMF, AUSF, UDM, UDR, PCF or SMF, user equipment devices, wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements, are configured to perform the steps of the methods described as being performed by the user equipment devices, wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., core network node, e.g., a core network node including a Network Management Function (NMF), a core network node including a Network (function) Repository Function (NRF), a network node including a AMF, AUSF, UDM, UDR, PCF or SMF, user equipment devices, wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements, with a processor which includes a component corresponding to each of the steps of the various described methods performed by the device in which the processor is included. In some but not all embodiments a device, e.g., core network node, e.g., a core network node including a Network Management Function (NMF), a core network node including a Network (function) Repository Function (NRF), a network node including a AMF, AUSF, UDM, UDR, PCF or SMF, user equipment devices, wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above. Depending on the embodiment, the computer program product can, and sometimes does, include different code for each step to be performed. Thus, the computer program product may, and sometimes does, include code for each individual step of a method, e.g., a method of controlling a device, e.g., core network nodes, e.g., a core network node including a Network Management Function (NMF), a core network node including a Network (function) Repository Function (NRF), a network node including a AMF, AUSF, UDM, UDR, PCF or SMF, user equipment devices, wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a core network node, e.g., a core network node including a Network Management Function (NMF), a core network node including a Network (function) Repository Function (NRF), a network node including a AMF, AUSF, UDM, UDR, PCF or SMF, a user equipment device, wireless device, mobile device, smartphone, subscriber device, desktop computer, printer, IPTV, laptop, tablets, network edge device, Access Point, wireless router, switch, WLAN controller, orchestration server, orchestrator, Gateway, AAA server, server, node and/or element or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of supporting network functions, the method comprising:
   operating a network management function (NMF) to receive a first network function register request message from a first network function (NF);
   checking a network management function database (NMFDB), to determine if the first NF is listed in the NMFDB, said NMFDB including maintenance mode indicators for individual network functions listed in the NMFDB; and
   creating, when said check determines that said NMFDB does not include an entry for the first NF, an entry in said NMFDB for the first NF.

2. The method of claim 1,
   wherein creating an entry in said NMFDB for the first NF includes creating an entry including a maintenance mode indicator indicating that said first NF is not in maintenance mode.

3. The method of claim 2, further comprising:
   operating the NMF to forward the received first network function register request message to a first network repository function (NRF); and
   operating the NMF to subscribe to the first NRF for status changes.

4. The method of claim 3, further comprising:
   operating the NMF to receive a first NF discovery request;
   operating the NMF to proxy the first NF discovery request to the first NRF; and
   operating the NMF to receive a response to the proxied first NF discovery request, said response including information indicating the first NF and another NF providing the same service as the first NF.

5. The method of claim 1,
   wherein said check at the NMFDB determines that said NMFDB includes an entry for the first NF;
   wherein the method further includes:
   checking, in response to said check determining that said NMFDB does include an entry for the first NF, the maintenance mode indicator for the first NF in the NMFDB to determine if maintenance mode is enabled for the first NF or disabled for the first NF; and
   wherein said check of the maintenance mode indicator corresponding to the first NF in the NMFDB indicates maintenance mode is not enabled for the first NF; and
   wherein the method further comprises:
      operating the NMF to forward the first network function register request message to a first network repository function (NRF) for processing.

6. The method of claim 5, further comprising:
   operating the NMF to receive a response to the forwarded first network function register request message from the NRF; and
   operating the NMF to forward the response to the forwarded first network function register request message to the first NF.

7. The method of claim 6, further comprising:
   checking, at the NMF, the response to the forwarded first network function register request message to determine if a first network function registration request was successful.

8. The method of claim 7, further comprising:
   operating the NMF to subscribe to the NRF for status changes corresponding to the first NF in response to determining that the first network function registration request was successful; and
   operating the NMF to remove the entry corresponding to the first NF from the NMFDB in response to determining that the first network function registration request was not successful.

9. The method of claim 5, wherein following the updating of the NMFDB entry for the first NF while the first NF is in maintenance mode, the information in an entry corresponding to the first NF in a NRF database will differ from an entry corresponding to the first NF in the NMFDB.

10. The method of claim 9, further comprising:
    in response to a change of the first NF maintenance mode indicator switching from a maintenance enabled state to maintenance mode not enabled state in the NMFDB, communicating information stored in the entry corresponding to the first NF in the NMFDB to the NRF to thereby update the state information stored in a NRF database to match the information stored in the entry for the first NF in the NMFDB.

11. The method of claim 1,
    wherein said check at the NMFDB determines that said NMFDB includes an entry for the first NF; and
    wherein said check of the maintenance mode indicator corresponding to the first NF in the NMFDB indicates maintenance mode is enabled for the first NF; and
    wherein the method further comprises:
       operating the NMF to update the status of the entry in the NMFDB corresponding to the first NF based on the first network function request message;
       operating the NMF to refrain from forwarding the first network function register request message to a first network repository function (NRF) for processing; and
       operating the NMF to send a success response to the first NF from which the first network function register request message was received.

12. A network management function (NMF) device comprising:
    a receiver;
    a transmitter;
    memory including a network management function database (NMFDB); and
    a processor configured to:
       operate the NMF to receive a first network function register request message from a first network function (NF);
       check the NMFDB to determine if the first NF is listed in the NMFDB, said NMFDB including maintenance mode indicators for individual network functions listed in the NMFDB; and
       create, when said check determines that said NMFDB does not include an entry for the first NF, an entry in said NMFDB for the first NF; and
       check, when said check determines that said NMFDB does include an entry for the first NF, the maintenance mode indicator for the first NF in the NMFDB to determine if maintenance mode is enabled for the first NF or disabled for the first NF.

13. The NMF device of claim 12,
    wherein said checking to determine if the first NF is listed in the NMFDB determines that said first NF is not listed in the NMFDB; and
    wherein said processor is configured to create an entry in said NMFDB for the first NF, said created entry including a maintenance mode indicator indicating that said first NF is not in maintenance mode.

14. The NMF device of claim 12,
wherein said check at the NMFDB determines that said NMFDB includes an entry for the first NF; and
wherein said check of the maintenance mode indicator corresponding to the first NF in the NMFDB indicates maintenance mode is not enabled for the first NF; and
wherein the processor is further configured to:
operate the NMF to forward the first network function register request message to a first network repository function (NRF) for processing.

15. The NMF device of claim 14, wherein said processor is further configured to:
operate the NMF to receive a response to the forwarded first network function register request message from the NRF; and
operate the NMF to forward the response to the forwarded first network function register request message to the first NF.

16. The NMF device of claim 15, wherein said processor is further configured to:
check, at the NMF, the response to the forwarded first network function register request message to determine if a first registration request was successful.

17. The network management function (NMF) device of claim 16, wherein said processor is further configured to:
operate the NMF to subscribe to the NRF for status changes corresponding to the first NF in response to determining that the first registration request was successful; and
operate the NMF to remove the entry corresponding to the first NF from the NMFDB in response to determining that the first registration request was not successful.

18. The network management function (NMF) device of claim 12,
wherein said check at the NMFDB determines that said NMFDB includes an entry for the first NF; and
wherein said check of the maintenance mode indicator corresponding to the first NF in the NMFDB indicates maintenance mode is enabled for the first NF; and
wherein the processor is further configured to:
operate the NMF to update the status of the entry in the NMFDB corresponding to the first NF based on the first network function register request message;
operate the NMF to refrain from forwarding the first network function register request message to a first network repository function (NRF) for processing; and
operate the NMF to send a success response to the first NF, from which the first network function register request message was received.

19. A non-transitory computer readable medium including machine executable instructions, which when executed by a processor of a network management function (NMF) device, cause the NMF device to:
operate the network management function (NMF) to receive a first network function register request message from a first network function (NF);
check a network management function database (NMFDB), to determine if the first NF is listed in the NMFDB, said NMFDB including maintenance mode indicators for individual network functions listed in the NMFDB; and
create, when said check determines that said NMFDB does not include an entry for the first NF, an entry in said NMFDB for the first NF; and
check, when said check determines that said NMFDB does include an entry for the first NF, the maintenance mode indicator for the first NF in the NMFDB to determine if maintenance mode is enabled for the first NF or is disabled for the first NF.

20. A method of supporting network functions, the method comprising:
operating a network management function (NMF) to receive a first network function register request message from a first network function (NF);
checking a network management function database (NMFDB), to determine if the first NF is listed in the NMFDB, said NMFDB including maintenance mode indicators for individual network functions listed in the NMFDB, said checking the NMFDB determining that said NMFDB includes an entry for the first NF; and
checking, in response to said check determining that said NMFDB does include an entry for the first NF, the maintenance mode indicator for the first NF in the NMFDB to determine if maintenance mode is enabled for the first NF or is disabled for the first NF.

* * * * *